(12) United States Patent
Cvetkovic et al.

(10) Patent No.: US 10,860,987 B2
(45) Date of Patent: Dec. 8, 2020

(54) PERSONALIZED CALENDAR FOR DIGITAL MEDIA CONTENT-RELATED EVENTS

(71) Applicant: Sony Interactive Entertainment LLC, San Mateo, CA (US)

(72) Inventors: Milan Cvetkovic, Los Angeles, CA (US); Wesley Curtis Voshell, Los Angeles, CA (US); Ashley Christine Koyama, Reseda, CA (US); Helen Yee, Los Angeles, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 726 days.

(21) Appl. No.: 15/384,108

(22) Filed: Dec. 19, 2016

(65) Prior Publication Data

US 2018/0174110 A1 Jun. 21, 2018

(51) Int. Cl.
*G06Q 10/10* (2012.01)
*G06Q 30/06* (2012.01)

(52) U.S. Cl.
CPC ......... *G06Q 10/1095* (2013.01); *G06Q 30/06* (2013.01)

(58) Field of Classification Search
CPC ...... G06Q 10/109; G06Q 30/02; G06Q 20/12; G06Q 20/123; G06Q 10/1093; H04L 2209/60
USPC ....................................................... 705/7.19
See application file for complete search history.

(56) References Cited

U.S. PATENT DOCUMENTS

| | | |
|---|---|---|
| 4,521,021 A | 6/1985 | Dixon |
| 4,542,897 A | 9/1985 | Melton et al. |
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |

(Continued)

FOREIGN PATENT DOCUMENTS

| | | |
|---|---|---|
| CA | 2106122 A1 | 3/1994 |
| CN | 11008878 A | 8/2019 |

(Continued)

OTHER PUBLICATIONS

Software: Yahoo Widgets Engine. Sep. 6, 2006.*

(Continued)

*Primary Examiner* — Johnna R Loftis
(74) *Attorney, Agent, or Firm* — Carr & Ferrell LLP

(57) ABSTRACT

A system for providing a personalized calendar comprises a server that hosts a database storing digital product event data, which associates a plurality of digital products with respective digital products event dates. The server repeatedly updates the digital product event data in the database, provides a user interface for a user, with the user interface being displayable on a remote user device of the user and includes a calendar widget personalized for the user based on a user account. The server further converts at least one portion of the digital product event data to display it through the calendar widget. The server can also receive user input indicating a date and identify a digital product associated with that date. In response to the input, the server modifies the user interface to display, in addition to the calendar widget, a digital product widget associated with the identified digital product.

20 Claims, 24 Drawing Sheets

(56) References Cited

U.S. PATENT DOCUMENTS

| | | |
|---|---|---|
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,740,549 A | 4/1998 | Reilly et al. |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford et al. |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,366,947 B1 | 4/2002 | Kavner |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Kelly et al. |
| 6,654,725 B1 | 11/2003 | Langheinrich et al. |
| 6,656,050 B2 | 12/2003 | Busch et al. |
| 6,659,861 B1 | 12/2003 | Fads et al. |

(56) References Cited

U.S. PATENT DOCUMENTS

| | | |
|---|---|---|
| 6,663,105 B1 | 12/2003 | Sullivan et al. |
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 | 3/2004 | Goldberg et al. |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,814,663 B2 | 11/2004 | Edwards et al. |
| 6,820,277 B1 | 11/2004 | Eldering et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B2 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,954,728 B1 | 10/2005 | Kusumoto et al. |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,995,788 B2 | 2/2006 | James |
| 7,047,302 B1 | 5/2006 | Chatani et al. |
| 7,072,849 B1 | 7/2006 | Filepp et al. |
| 7,085,733 B2 | 8/2006 | Ebisawa |
| 7,086,187 B2 | 8/2006 | Bandak |
| 7,136,871 B2 | 11/2006 | Ozer et al. |
| 7,171,480 B2 | 1/2007 | Chatani |
| 7,305,442 B1 | 12/2007 | Lundy |
| 7,421,454 B2 | 9/2008 | DeShan et al. |
| 7,761,328 B2 | 7/2010 | Kutaragi et al. |
| 7,895,076 B2 | 2/2011 | Kutaragi et al. |
| 8,196,168 B1 | 6/2012 | Bryan et al. |
| 2001/0010757 A1 | 8/2001 | Mori et al. |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | ST-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0013177 A1 | 1/2002 | Richter |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |
| 2002/0067730 A1 | 6/2002 | Hinderks et al. |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1 | 7/2002 | Zustak et al. |
| 2002/0087403 A1 | 7/2002 | Meyers et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | DeWolf et al. |

(56) References Cited

U.S. PATENT DOCUMENTS

| | | |
|---|---|---|
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0116284 A1 | 8/2002 | Steelman et al. |
| 2002/0120589 A1 | 8/2002 | Aoki |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0161625 A1 | 10/2002 | Brito-Valladares et al. |
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110171 A1 | 6/2003 | Ozer et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0122864 A1 | 7/2003 | Jenne et al. |
| 2003/0126150 A1 | 7/2003 | Chan |
| 2003/0139966 A1 | 7/2003 | Sirota et al. |
| 2003/0144044 A1 | 7/2003 | Pisarsky |
| 2003/0144048 A1 | 7/2003 | Silva |
| 2003/0149618 A1 | 8/2003 | Sender et al. |
| 2003/0149623 A1 | 8/2003 | Chen |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172005 A1 | 9/2003 | Heillat et al. |
| 2003/0172376 A1 | 9/2003 | Coffin |
| 2003/0177490 A1 | 9/2003 | Hoshino et al. |
| 2003/0182567 A1 | 9/2003 | Barton et al. |
| 2003/0182663 A1 | 9/2003 | Gudort et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0212608 A1 | 11/2003 | Cliff |
| 2003/0216961 A1 | 11/2003 | Barry |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicholas et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Alfieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |

(56) References Cited

U.S. PATENT DOCUMENTS

| | | |
|---|---|---|
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton et al. |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0003839 A1 | 1/2005 | Tripp |
| 2005/0005242 A1 | 1/2005 | Hoyle |
| 2005/0015267 A1 | 1/2005 | Barringer et al. |
| 2005/0021387 A1 | 1/2005 | Gotffurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0107158 A1 | 5/2005 | Kanisawa et al. |
| 2005/0113170 A1 | 5/2005 | McHugh |
| 2005/0114526 A1 | 5/2005 | Aoyama |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0203804 A1 | 9/2005 | Suzuki et al. |
| 2005/0203811 A1 | 9/2005 | David |
| 2005/0204381 A1 | 9/2005 | Ludvig et al. |
| 2005/0215310 A1* | 9/2005 | Boyd ................... G07F 17/32 463/20 |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Altberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0288999 A1 | 12/2005 | Lerner et al. |
| 2006/0085517 A1 | 4/2006 | Kaurila |

(56) References Cited

U.S. PATENT DOCUMENTS

| | | | |
|---|---|---|---|
| 2006/0167747 A1 | 7/2006 | Goodman et al. | |
| 2006/0179453 A1 | 8/2006 | Kadie et al. | |
| 2006/0212350 A1 | 9/2006 | Ellis et al. | |
| 2006/0230141 A1 | 10/2006 | Willis | |
| 2006/0245504 A1 | 11/2006 | Ogikubo et al. | |
| 2006/0248209 A1 | 11/2006 | Chiu et al. | |
| 2006/0253323 A1 | 11/2006 | Phan et al. | |
| 2006/0265503 A1 | 11/2006 | Jones et al. | |
| 2006/0268667 A1 | 11/2006 | Jellison et al. | |
| 2007/0027760 A1 | 2/2007 | Collins et al. | |
| 2007/0027771 A1 | 2/2007 | Collins et al. | |
| 2007/0027852 A1 | 2/2007 | Howard et al. | |
| 2007/0038931 A1 | 2/2007 | Allaire et al. | |
| 2007/0043616 A1 | 2/2007 | Kutaragi et al. | |
| 2007/0050254 A1 | 3/2007 | Driscoll | |
| 2007/0073756 A1 | 3/2007 | Manhas et al. | |
| 2007/0078714 A1 | 4/2007 | Ott et al. | |
| 2007/0083611 A1 | 4/2007 | Farago et al. | |
| 2007/0124134 A1 | 5/2007 | Van Kommer | |
| 2007/0130594 A1 | 6/2007 | Hidary et al. | |
| 2007/0146812 A1 | 6/2007 | Lawton | |
| 2007/0174471 A1 | 7/2007 | Van Rossum | |
| 2007/0244760 A1 | 10/2007 | Bodnar et al. | |
| 2008/0016188 A1* | 1/2008 | Batni | H04M 1/72566 709/220 |
| 2008/0097872 A1 | 4/2008 | Peckover | |
| 2008/0152300 A1 | 6/2008 | Knee et al. | |
| 2008/0206732 A1 | 8/2008 | Zalewski | |
| 2008/0250334 A1* | 10/2008 | Price | G06Q 10/109 715/753 |
| 2008/0288460 A1 | 11/2008 | Poniatowski et al. | |
| 2009/0037253 A1 | 2/2009 | Davidow et al. | |
| 2009/0183081 A1 | 7/2009 | Rodriguez et al. | |
| 2010/0063866 A1 | 3/2010 | Kinoshita et al. | |
| 2010/0287070 A1* | 11/2010 | Santeufemia | G06Q 30/0603 705/26.25 |
| 2010/0306061 A1 | 12/2010 | Wagner | |
| 2010/0333137 A1* | 12/2010 | Hamano | H04H 60/46 725/39 |
| 2011/0173054 A1 | 7/2011 | Kutaragi et al. | |
| 2011/0231873 A1 | 9/2011 | Toebes et al. | |
| 2011/0289183 A1 | 11/2011 | Rollins | |
| 2012/0066059 A1* | 3/2012 | Berger | G06Q 30/0251 705/14.49 |
| 2012/0102431 A1* | 4/2012 | Krolczyk | G06Q 10/00 715/790 |
| 2012/0102573 A1 | 4/2012 | Spooner et al. | |
| 2012/0123865 A1 | 5/2012 | Salzano | |
| 2013/0110980 A1 | 5/2013 | Benn et al. | |
| 2014/0058766 A1 | 2/2014 | Yu et al. | |
| 2014/0122203 A1 | 5/2014 | Johnson et al. | |
| 2015/0058873 A1* | 2/2015 | Newell | H04N 21/47214 725/14 |
| 2015/0332232 A1* | 11/2015 | Wright | G06Q 10/08 705/26.1 |
| 2016/0044090 A1 | 2/2016 | Glickfield et al. | |
| 2016/0117754 A1 | 4/2016 | DeStefano et al. | |
| 2016/0180447 A1 | 6/2016 | Kamalie et al. | |
| 2016/0248865 A1* | 8/2016 | Dotan-Cohen | H04L 67/26 |
| 2016/0253631 A1 | 9/2016 | Jones et al. | |
| 2017/0289619 A1 | 10/2017 | Xu et al. | |
| 2018/0098101 A1 | 4/2018 | Pont et al. | |
| 2018/0098119 A1 | 4/2018 | Overcash et al. | |
| 2018/0108054 A1 | 4/2018 | Doubinski et al. | |
| 2018/0144392 A1 | 5/2018 | Johnson et al. | |
| 2019/0208283 A1 | 7/2019 | Sanghavi | |

FOREIGN PATENT DOCUMENTS

| | | |
|---|---|---|
| CN | 111512635A A | 8/2020 |
| EP | 0337539 A2 | 10/1989 |
| EP | 0405776 A2 | 1/1991 |
| EP | 0620688 A2 | 10/1994 |
| EP | 0625760 A1 | 11/1994 |
| EP | 0743595 A2 | 5/1996 |
| EP | 3555728 A1 | 10/2019 |
| GB | 2141907 A | 1/1985 |
| GB | 2194369 A | 3/1988 |
| JP | H01220925 | 9/1989 |
| JP | H06-335569 | 12/1994 |
| JP | H08117445 | 5/1996 |
| JP | H08173634 | 7/1996 |
| JP | H08280934 | 10/1996 |
| JP | 2001321556 A | 11/2001 |
| JP | 2002366971 A | 12/2002 |
| JP | 2003248844 A | 9/2003 |
| JP | 2004298469 A | 10/2004 |
| JP | 2008527476 A | 7/2008 |
| JP | 2010176321 A | 12/2010 |
| WO | WO1993014462 | 7/1993 |
| WO | WO1993019427 | 9/1993 |
| WO | WO1993022017 | 11/1993 |
| WO | WO1993023125 | 11/1993 |
| WO | WO1995012442 | 5/1995 |
| WO | WO1995012853 | 5/1995 |
| WO | WO1999059097 | 11/1999 |
| WO | WO2003032127 | 4/2003 |
| WO | WO2005086969 A2 | 9/2005 |
| WO | WO2018118268 A1 | 6/2018 |
| WO | WO2019135826 A1 | 7/2019 |

OTHER PUBLICATIONS

"International Search Report" and "Written Opinion of the International Searching Authority", Patent Cooperation Treaty Application No. PCT/US2017/061276, dated Jan. 18, 2018, 13 pages.
Price Waterhouse Coopers, "IAB Online Ad Measurement Study," Dec. 2001; 1-52.
Nielsen Media Research, "What TV Ratings Really Mean (And Other Frequently-Asked Questions)." Jun. 2005 (7 pages).
Business Wire, "RTIME Announces First 100-Person Twitch Game for Internet; "RTIME Rocks!" Demonstrates the Sower of RTIME Interactive Networking Engine to Support Large Scale, High Performance, Internet Game Play." Look Smart: Find Articles: Apr. 14, 1997. (3 pages).
Business Wire, "Juno Launches America's First Free Internet E-mail Service; Initial Advertisers Include Lands' End, Miramax and Snapple", Apr. 19, 1996. (4 pages).
"International Search Report" and "Written Opinion of the International Searching Authority", Patent Cooperation Treaty Application No. PCT/US2018/058677, dated Dec. 17, 2018, 12 pages.
"Extended European Search Report", European Application No. 17883956.9, dated Jun. 12, 2020, 9 pages.
"Office Action", Japan Patent Application No. 2019-532735, dated Sep. 1, 2020, 3 pages [7 pages with translation].

\* cited by examiner

FIG. 11

PERSONALIZED CALENDAR FOR DIGITAL MEDIA CONTENT-RELATED EVENTS

BACKGROUND

This disclosure generally relates to personalized calendars. More particularly, this disclosure relates to a system and method for providing a personalized calendar that automatically displays digital media content events. The system and method of this disclosure can be applicable, for example, for an online digital content store such as the PlayStation™ store.

It is common for customers to purchase products and services online using computers or mobile devices. Among products that can be purchased online are digital products, including computer games and multimedia content such as video, audio, television shows, and so forth. When a user makes a purchase of a certain digital product, it can be accessed by, or downloaded to, a user device. Online stores or platforms for digital products repeatedly update their inventory of digital products, however, customers may find it difficult to track these updates through multiple online stores and platforms.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one aspect of this disclosure, there is provided a system for providing a personalized calendar. In one example embodiment, the system comprises a server including at least one processor, a non-transitory computer-readable medium including a computer-executable program code, and a network interface configured to operatively connect the server with a plurality of remote user devices. The system can also include at least one database hosted by the server. The at least one database is configured to store digital product event data, which associates a plurality digital products with respective digital product event dates. When the computer-executable program code is executed by the at least one processor, the at least one processor repeatedly updates the digital product event data in the at least one database, provides a user interface for a user of the user account, where the user interface is displayable on a remote user device of the user and includes a calendar widget personalized for the user based on the user account, and converts at least one portion of the digital product event data to display the at least one portion of the digital product event data via the calendar widget.

In another aspect of the disclosure, there is provided a computer-implemented method for generating a personalized calendar. In one example embodiment, the method comprises: maintaining a user account; maintaining at least one database storing digital product event data, where the digital product event data associates a plurality digital products with respective digital products event dates; repeatedly updating the digital product event data in the at least one database; providing a user interface for a user of the user account, where the user interface being displayable on a remote user device of the user, and where the user interface includes a calendar widget personalized for the user based on the user account; and converting at least one portion of the digital product event data to display the at least one portion of the digital product event data through the calendar widget.

In yet an additional aspect of this disclosure, there is provided a non-transitory processor-readable medium having instructions stored thereon, which when executed by one or more processors, cause the one or more processors to implement a method, which comprises: maintaining a user account; maintaining at least one database storing digital product event data, where the digital product event data associates a plurality of digital products with respective digital products event dates; repeatedly updating the digital product event data in the at least one database; providing a user interface for a user of the user account, where the user interface being displayable on a remote user device of the user, and where the user interface includes a calendar widget personalized for the user based on the user account; and converting at least one portion of the digital product event data to display the at least one portion of the digital product event data through the calendar widget.

Additional objects, advantages, and novel features of the examples will be set forth in part in the description, which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 11 shows yet another example of a graphical user interface of the online platform showing the personalized calendar adjusted to show certain digital product events for a selected date.

Figure 1:
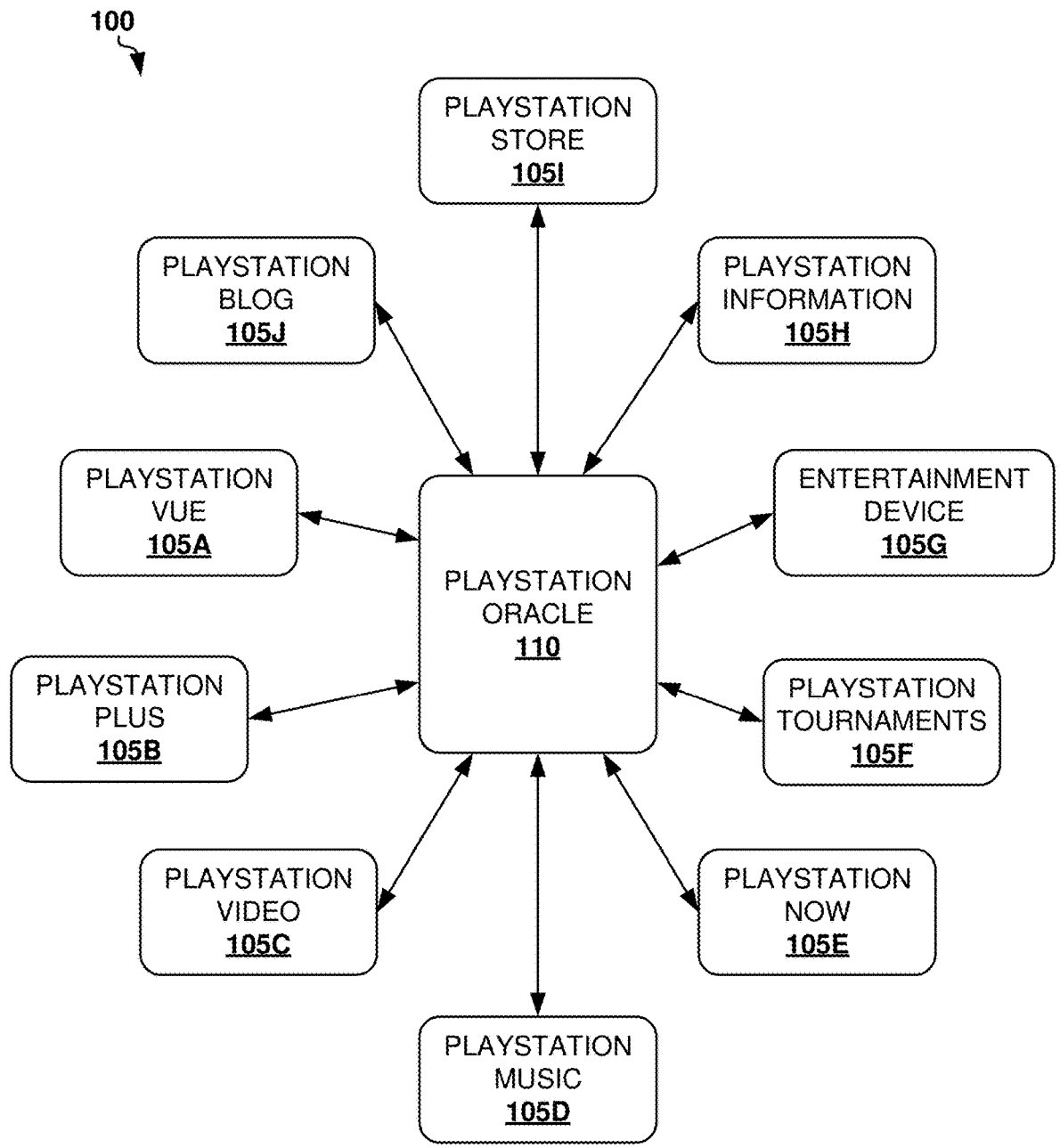
FIG. 1 shows a block diagram illustrating an interaction scheme of personalized calendar in an online gaming platform with a plurality of online services or applications.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION OF EXAMPLE EMBODIMENTS

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the present disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the invention.

Aspects of the embodiments will now be presented with reference to a system and method for providing a personalized calendar. This system and method is described in this section and illustrated in the accompanying drawings by various blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with hardware having one or more processors. Examples of processors include microprocessors, microcontrollers, Central Processing Units, digital signal processors, field programmable gate arrays, programmable logic devices, state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

The term "user device" shall mean any electronic device configured to process and display data. By way of example, not limitation, some examples of user devices include a mobile device, cellular phone, user equipment, user terminal, mobile phone, smart phone, Internet phone, tablet computer, laptop computer, desktop computer, general-purpose computer, workstation, thin client, personal digital assistant, music player, multimedia player, game console, gaming device, navigation system, television system, home gateway, broadband gateway, network appliance, netbook, set top box, access gateway, networking switch, entertainment system, and infotainment system. The terms "user device" and "remote user device" can be used interchangeably.

The term "digital product" shall be construed to mean one or more of the following: media content, multimedia content, entertainment content, video, video-on-demand, pay-per-view video, audio, music, television show, television program, movie, computer game, network computer game, video game, Internet game, network game, tournament, console game, virtual reality content, virtual reality game, electronic book, and electronic magazine. According to embodiments of this disclosure, digital products can be for purchase only. The terms "digital content" and "digital product" can be used interchangeably. The terms "computer game" and "video game" shall mean the same.

The term "user interface" may refer to the software, the display screens, and/or the functionality provided by embodiments of this disclosure that facilitate at least the accessing, reviewing, downloading, or purchasing digital products by users. Accordingly, the term "user interface" may refer to a graphical user interface to enabling a user to interact with the system or may refer to a computer programming interface (API) for establishing data communication between the user device and server.

The term "digital product event" shall mean an act with a particular digital product that is directed to a user or a group of users (customers or prospect customers) and associated with a certain date and time. One example of digital product event refers to a release date of a certain digital product. Another example of digital product event refers to a scheduled network game tournament. The term "digital product event data" shall mean digital data linking a particular digital product (or a corresponding identifier of particular digital product) with a digital product event. For example, digital product event data can provide that a certain computer game is released on a particular date for a certain user, group of users, or general public.

The embodiments of this disclosure provide a single and interactive calendar of digital product events personalized for a particular user of one or more online stores or online digital content platforms. In the calendar, each date can be associated with certain digital product events that can be graphically identified for the user. The calendar also provides interactive capabilities for the user such that he can review, access, download, note, or purchase certain digital products. For example, the personalized and interactive calendar of this disclosure can be provided in the PlayStation™ online platform to display a plurality of digital product events, which are associated with other different online platforms, interfaces, stores, and the like. Accordingly, the present disclosure enables the user to use the calendar to review when certain computer games are released, when tournament games are scheduled, when certain movies, television (TV) shows, or multimedia content become available to the user, and so forth. The user can make orders, pre-orders, or purchases of the digital products right from the calendar. The user can also set notifications, share, and like the digital products. The user can also launch certain digital products from the calendar. In this sense, the calendar of this disclosure provides capabilities for interacting with the past, present, and the future of digital products. Thus, the embodiments of this disclosure help solving a technical problem of personalizing an interactive calendar by integrating digital product event data from a plurality of sources, which can also improve the operation of a computer, such as a game device, by enabling a user to navigate through the calendar events having disparate sources faster.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 24:
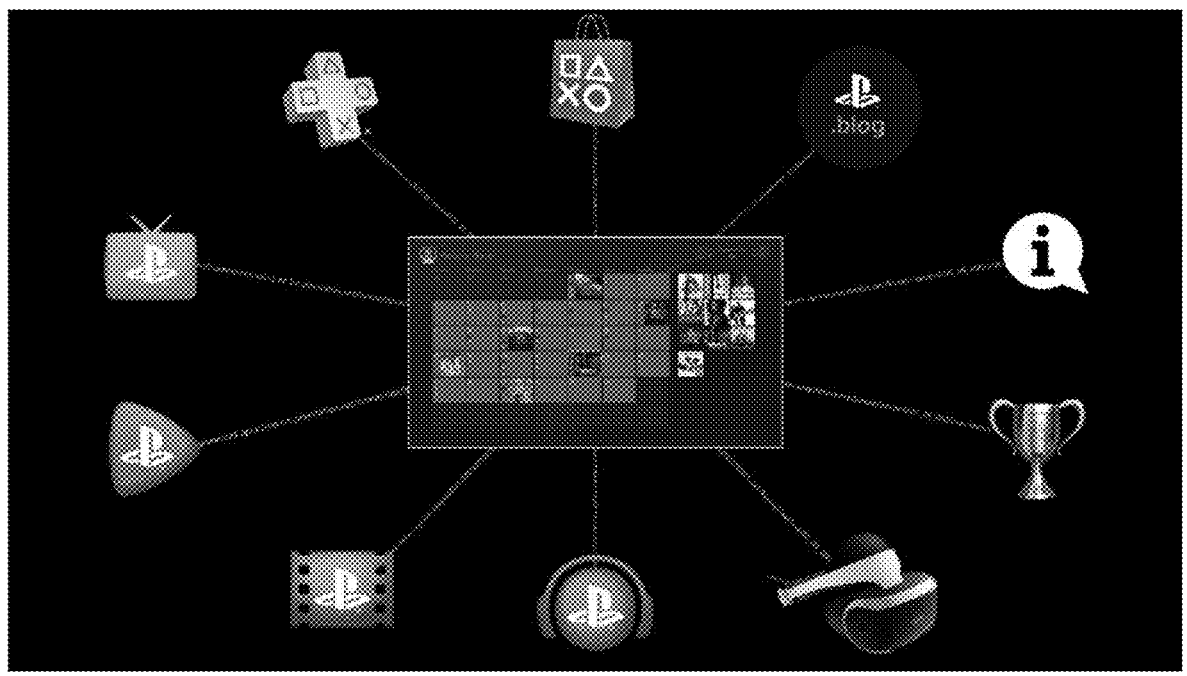
FIG. 24 is a block diagram illustrating interactions of a personalized calendar of an online gaming platform with a plurality of online services or applications.

FIGS. 1 and 24 show a block diagram illustrating an interaction scheme 100 of personalized calendar in an online gaming platform with a plurality of online services or applications. Here, the personalized calendar can be available for a user through PlayStation Oracle platform 105, which provides a user graphical interface for displaying the calendar and enabling the user to interactively communicate with the calendar. PlayStation Oracle platform 105 can be operatively connected or associated with a plurality of software applications, online stores, web services, online multimedia content platforms, online game platforms, and so forth. For example, as shown in FIG. 1, PlayStation Oracle platform 105 can be linked to the following web services: "PlayStation Vue" online platform 105A, "PlayStation Plus" online platform 105B, "PlayStation Video" online platform 105C, "PlayStation Music" online platform 105D, "PlayStation Now" online platform 105E, "PlayStation Tournaments" online platform 105F, entertainment device 105G (e.g., PlayStation Virtual Reality (VR) online platform, VR device, gaming console, etc.), "PlayStation Information" online platform 105H, "PlayStation Store" online platform 105I, "PlayStation Blog" online platform 105J, and the like. Accordingly, the user does not need to visit these online platforms 105A-105J individually and separately to learn about certain digital product events, because the user can visit only PlayStation Oracle platform 105 to access information of digital product events obtained from all of the online platforms 105A-105J and presented in an organized and informative manner.

Figure 2:
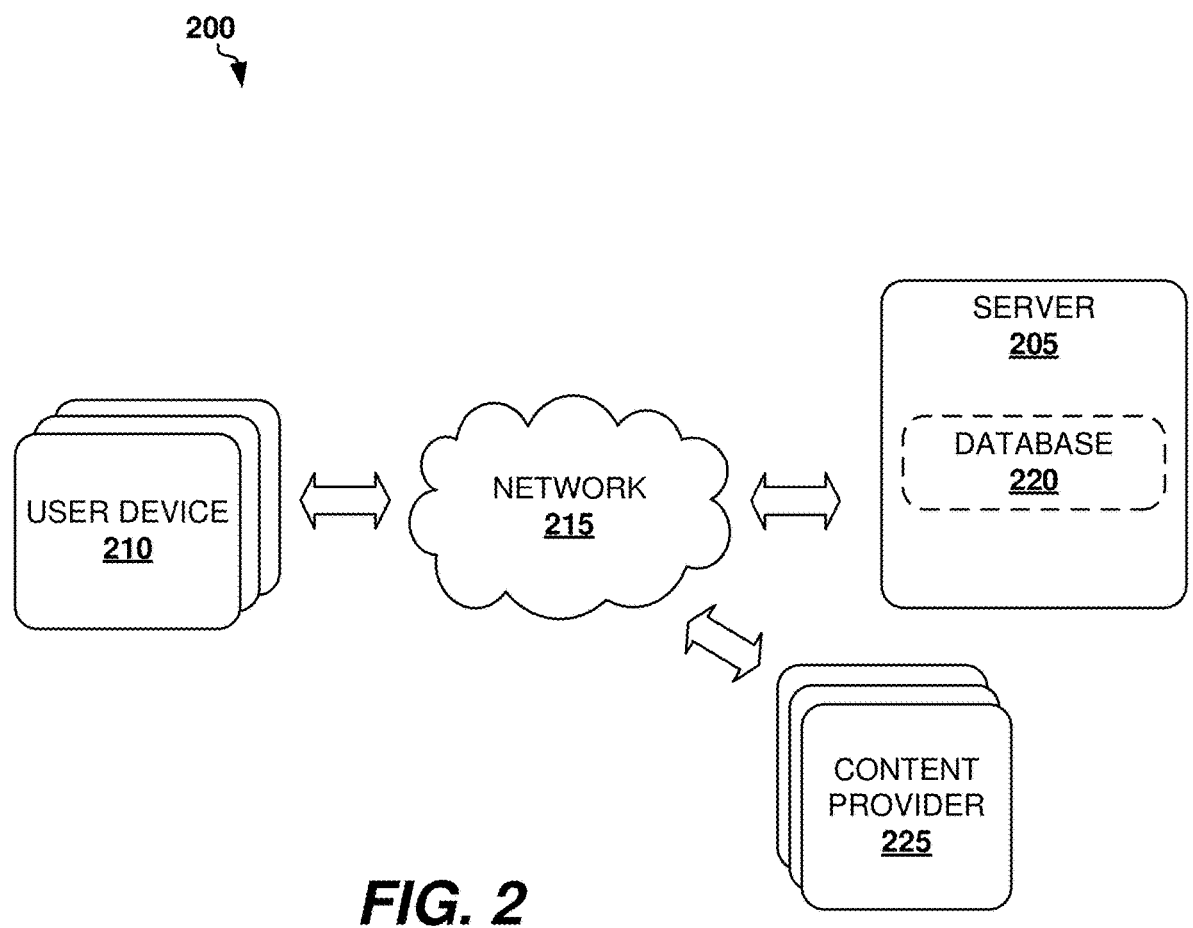
FIG. 2 shows a block diagram illustrating a system for providing a personalized calendar.

FIG. 2 shows a block diagram illustrating a system 200 for providing a personalized calendar according to one example embodiment. System 200 includes a server 205 including at least one processor, computer-readable medium for storing a database 220 and computer-implementable instructions, and a network interface for enabling server 205 to communicate with other elements of system 200. Server 205 maintains and provides an online store or online game platform such as PlayStation™ online game platform or PlayStation™ store for selling digital products to users.

Server 205 can be in operative communication with one or more user devices 210 via one or more communications networks 215. As explained above, user devices 210 are operated by users and can refer to personal computers, game consoles, mobile devices, and the like. Communications network 215 can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, Internet Protocol (IP) communications network, or any other data communication network utilizing physical layers, link layer capability, or network layer to carry data packets, or any combinations of the above-listed data networks.

System 200 also includes one or more content providers 225 such as server computers, which can store digital products. The digital products can be transmitted or broadcasted to selected user devices 210 based on instructions received from server 205. For example, when a user of one of user devices 210 accesses the online store maintained by server 205 and purchases a certain digital product, it can be downloaded from one of content providers 225 to the respective user device 210; or user device 210 can be granted access to content provider 225 to access the purchased digital product.

Database 220 can maintain user accounts, user settings, user preferences, user personal information, user payment information, optionally some digital products, and digital product event data. Database 220 can be relational database storing identifiers or references of digital products associated with digital product event dates, user identifiers, and user accounts.

As explained herein, the user of user device 210 can access the online platform maintained by server 205 to access and interact with a personalized calendar. The user can review one or more digital products and digital product events in the calendar.

An example implementation of user device 210 and server 205 is further illustrated in FIG. 13 and explained below. The following FIGS. 3-11 illustrate various graphical user interfaces (display screens) of the online digital platform and serve to explain the process of producing and interacting with the personalized calendar. The graphical user interfaces of FIGS. 3-11 can be displayed on a display of user devices 210.

Figure 3:
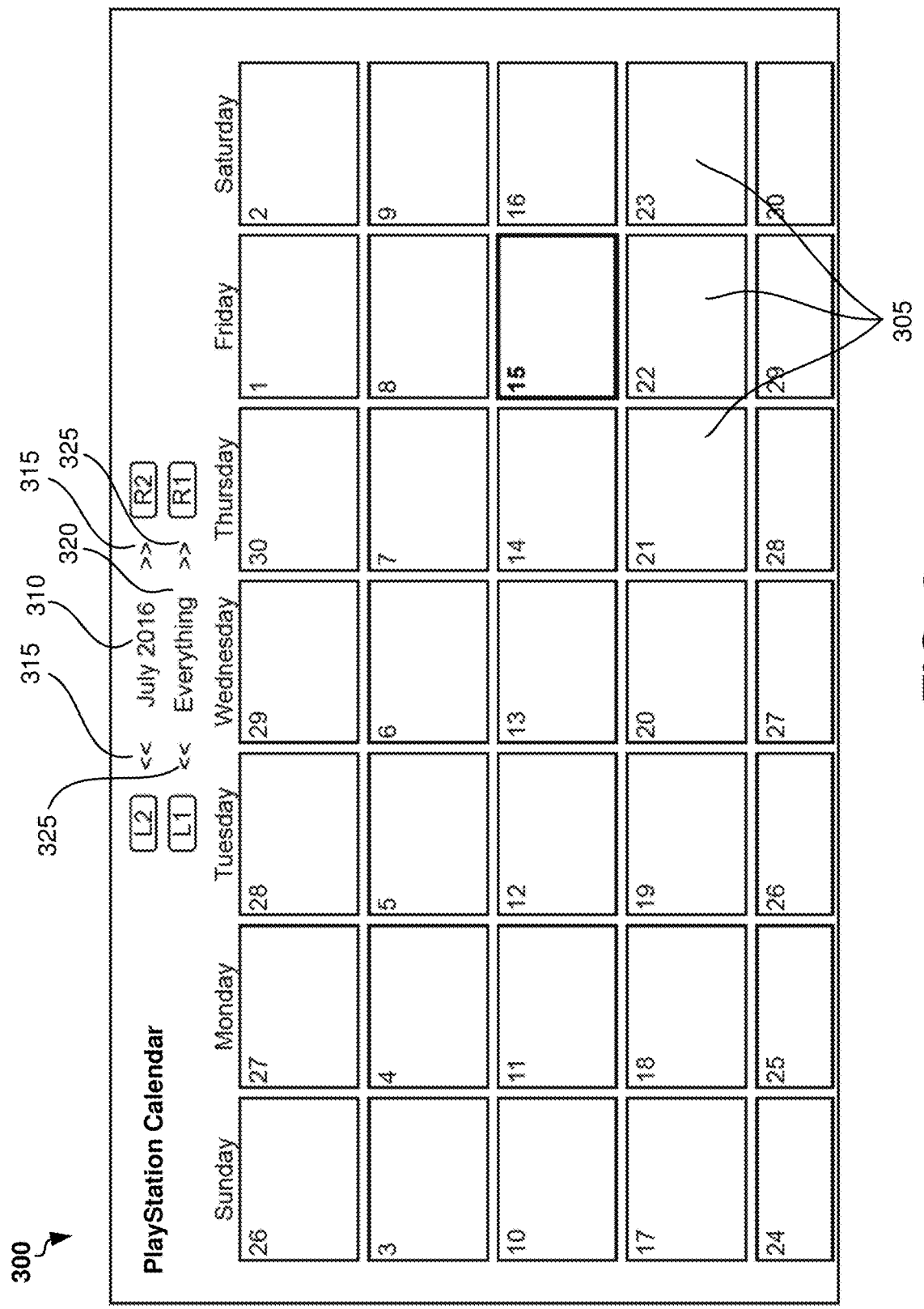
FIG. 3 shows an example portion of a graphical user interface of an online platform showing a calendar widget of a personalized calendar.

FIG. 3 shows an example portion of a graphical user interface 300 of an online platform showing a calendar widget for a personalized calendar according to one embodiment. The online platform can be maintained or hosted by server 205 such that it is available for use by a plurality of users. One example of the online platform is PlayStation Oracle. Alternatively, the online platform can be a website aggregating data from a plurality of online stores for digital products.

Graphical user interface 300 includes a plurality of day widgets 305 (e.g., icons), each of which represents a certain date in the personalized calendar. In the shown example, there are presented day widgets 305 with respect to a whole month (e.g., July of 2016). A display element 310 can indicate the month, which is currently viewed by the user. Day widgets 305 can be arranged in any organized manner, for example, in an array commonly used in traditional calendars.

Graphical user interface 300 further includes one or more hyperlinks or other clickable or soft buttons, such as clickable buttons 315, configured to cause switching, changing or selecting (upon actuation by the user) a month of interest and year of interest. Alternatively, clickable buttons 315, when actuated, can cause switching, changing or selecting a week or day. In some embodiments, the calendar widget can display more than one month, for example, twelve months.

In graphical user interface 300, one or more day widgets 305 can include one or more graphical elements or icons associated with certain digital product events such as a release of a particular computer game of interest for the user based on his preferences, predetermined rules or user account.

Figure 4:
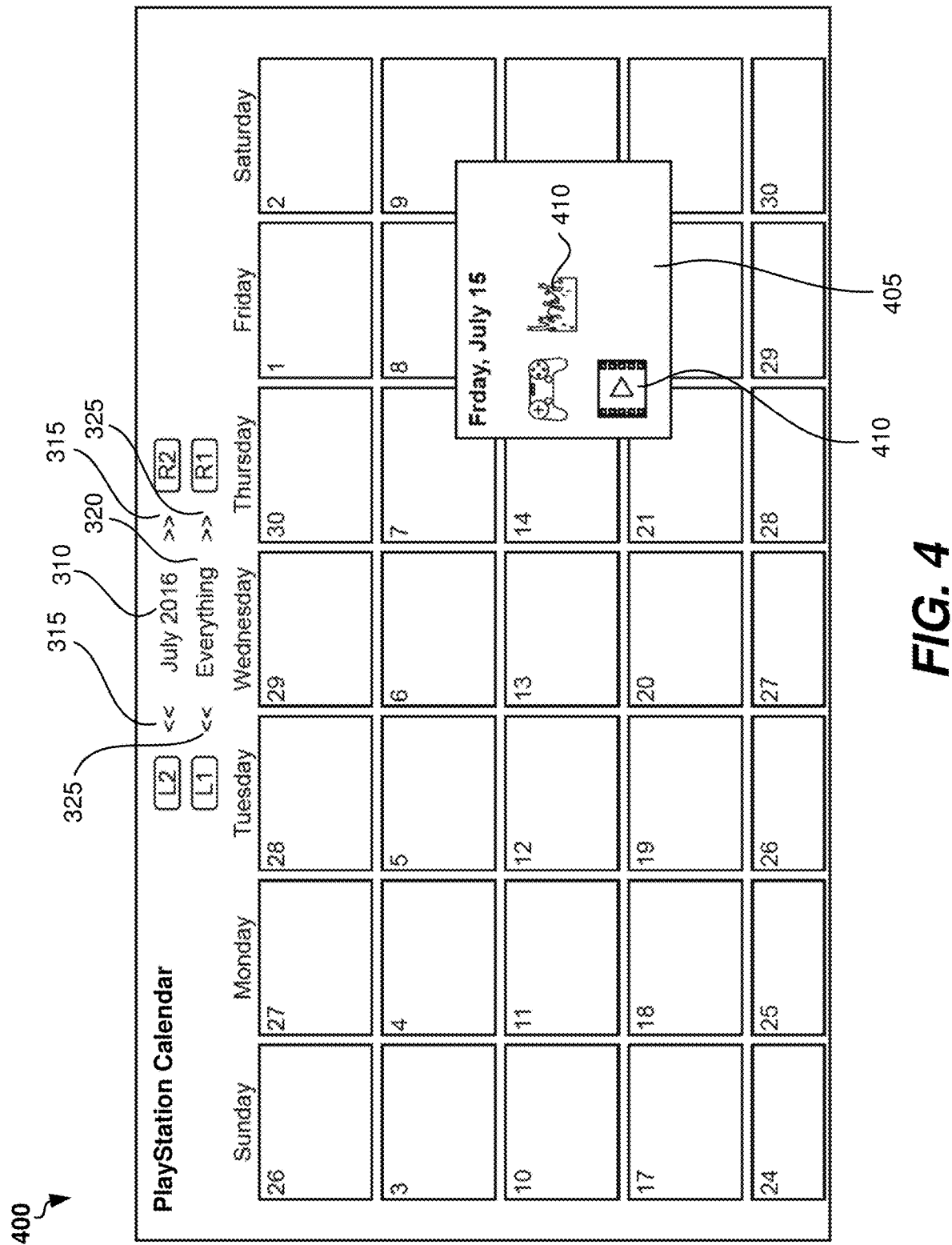
FIG. 4 shows an example portion of a graphical user interface of the online platform showing the same calendar widget as in FIG. 3, but where one of day widgets is selected by a user.

Graphical user interface 300 can also enable the user to select at least one day widget 305 and go over from one day widget 305 to another day widget 305 of his interest. For example, FIG. 4 shows a portion of a graphical user interface 400 of the online platform showing the same calendar widget of the personalized calendar as in FIG. 3, but where one of day widgets 305 is selected by the user. In this illustration, graphical user interface 400 displays selected day widget 405 as an enlarged interface element. Selected day widget 405 can include one or more graphical elements or icons 410 associated with certain digital product events such as a release of a particular computer game of interest for the user based on his preferences, predetermined rules or user account. In the shown example, icons 410 symbolize a release of a new movie, a release of a new computer game, and a release of a new music album (or TV show).

In certain embodiments, the user may program graphical user interface 400 to show all or only selected types of digital products in day widgets. In FIG. 4, an interface element 320 provides "Everything" meaning that all possible types of digital products are displayed in the calendar. The user, however, can manipulate with hyperlinks or other clickable or soft buttons, such as clickable buttons 325, to cause switching, changing or selecting (upon actuation by the user) the type of digital products displayed in graphical user interface 400.

Figure 5:
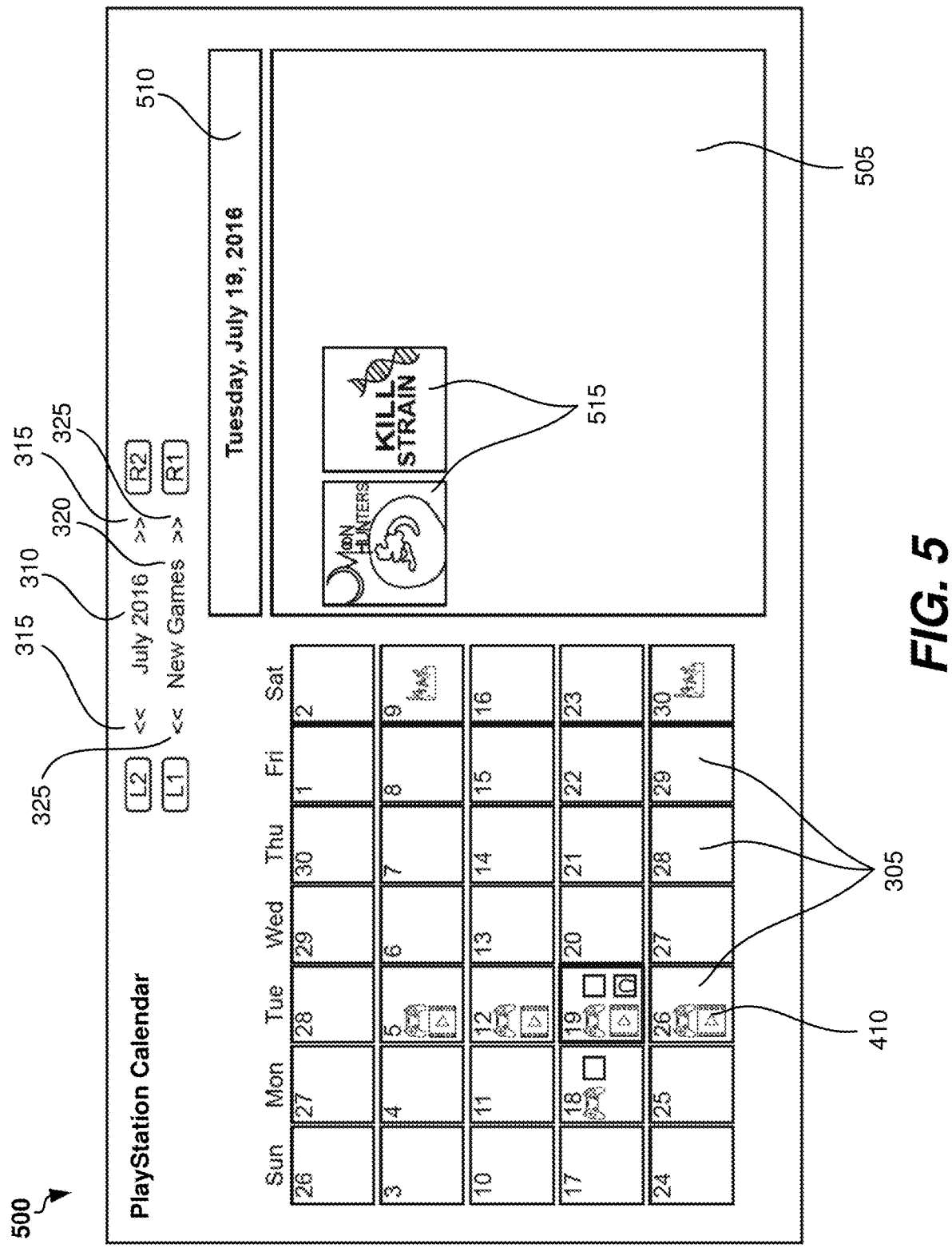
FIG. 5 shows another example of a graphical user interface of the online platform showing the personalized calendar adjusted to show "New Games" events only.

FIG. 5 shows another example of a graphical user interface 500 of the online platform showing the personalized calendar adjusted to show digital product events associated with "New Games" only according to one embodiment. Graphical user interface 500 includes the calendar widget on the left side, which has a plurality of day widgets 305. Day widgets 305 are presented in an organized array such as to illustrate all days in a given month. One or more of day widgets 305 can include one or more graphical elements or icons 410 associated with certain digital product events such as a release of a particular computer game of interest for the user based on his preferences, predetermined rules or user account. The right side of graphical user interface 500 includes a user interface element 505 for showing one or more enlarged graphical elements or enlarged icons 515, each of which is associated with certain digital product events for a given or selected date. The selected date is displayed in a user interface element 510. The date can be selected by the user by manipulating user device 210. For example, the user can actuate or click hyperlinks or clickable buttons 315 to cause switching, changing or selecting a month and year of the calendar. The user can also navigate through day widgets 305 and select any of them to cause user interface element 505 displaying enlarged graphical elements or enlarged icons 515 of certain digital product events associated with the selected date. By default, user interface element 505 displays all types of digital products or digital product events. However, the user can actuate or click hyperlinks or clickable buttons 325 to cause switching, changing or selecting the type of digital products displayed in user interface element 505. For example, as shown in FIG. 5, the user can select "New Games" in order for user interface element 505 displaying only releases or other events of computer games.

Figure 6:
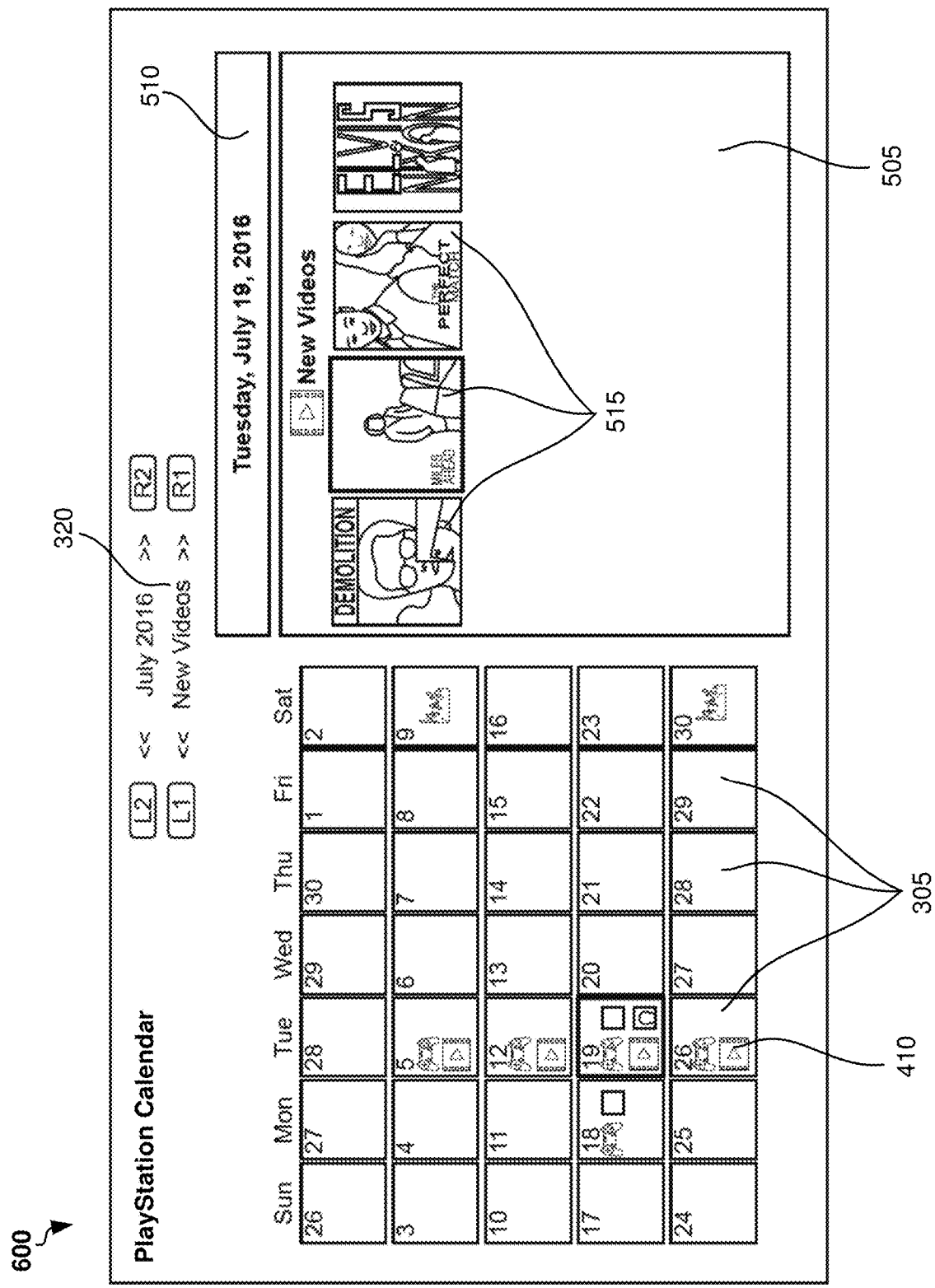
FIG. 6 shows another example of a graphical user interface of the online platform showing the personalized calendar adjusted to show "New Videos" events only.

FIG. 6 shows another example of a graphical user interface 600 of the online platform showing the personalized calendar adjusted to show digital product events associated with "New Videos" only according to one embodiment. Accordingly, FIG. 6 is substantially the same as in FIG. 5, but in FIG. 6 the user manipulated with hyperlinks or clickable buttons 325 to select "New Videos" type of digital products to be displayed in user interface element 505. Thus, as can be seen in FIG. 6, user interface element 505 includes a plurality of enlarged graphical elements or enlarged icons 515 characterizing new videos or movies, which become available to the user on the selected date (i.e., Jul. 19, 2016).

Figure 7:
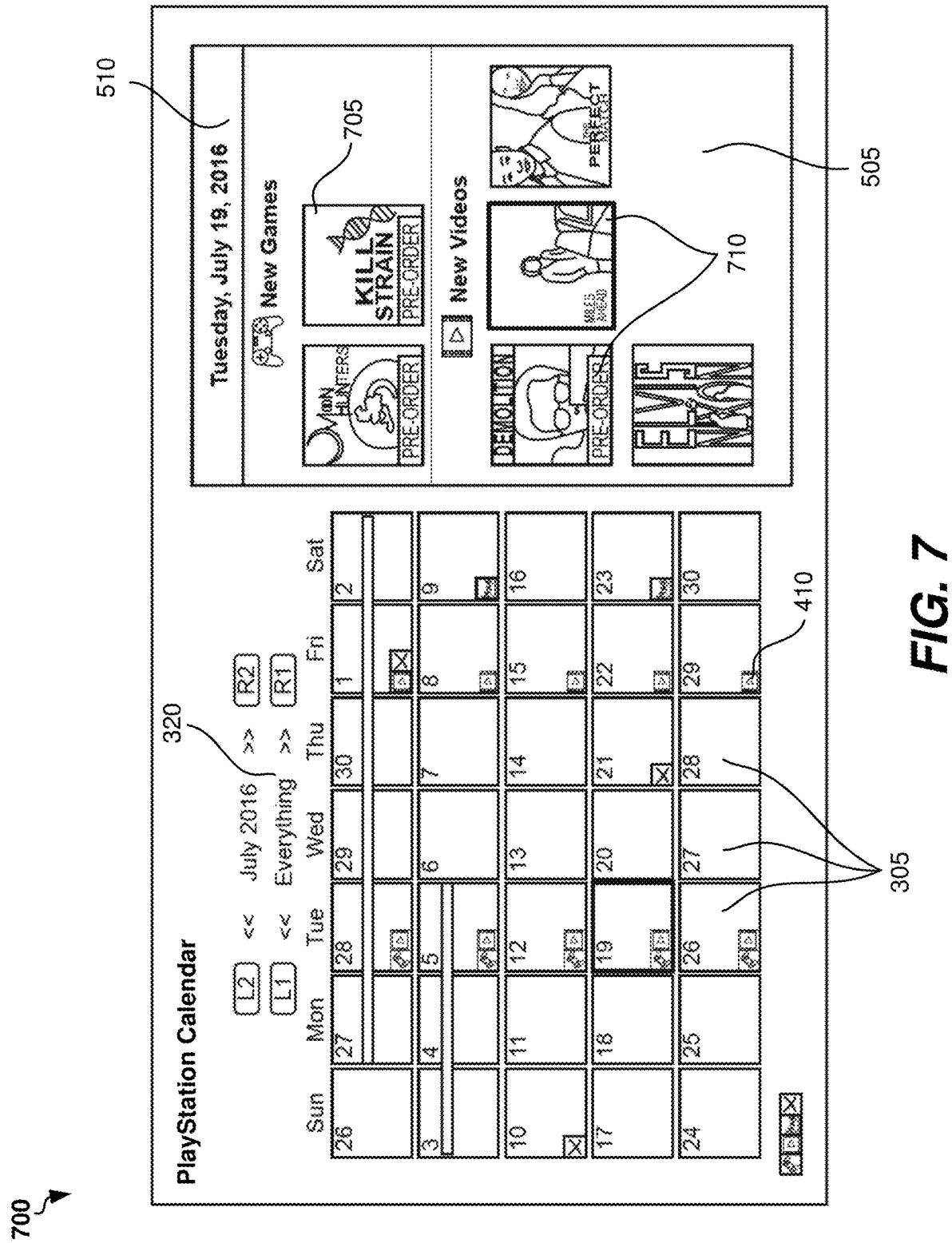
FIG. 7 shows another example of a graphical user interface of the online platform showing the personalized calendar adjusted to show all digital product events for a selected date.

FIG. 7 shows yet another example of a graphical user interface 700 of the online platform showing the personalized calendar adjusted to show all digital product events for a selected date according to one embodiment. In other words, graphical user interface 700 is substantially the same as shown in FIG. 5 or FIG. 6, however graphical user interface 700 includes user interface element 505 where displayed all types of digital product events for a selected date. For example, user interface element 505 can display enlarged icons 705 illustrating new computer games and enlarged icons 710 illustrating new movies that are to be released or were released on the selected date. Each of enlarged icons 515, 705, and 710 can serve as a clickable button or hyperlink, which when enabled by the user, causes switching screens to display predetermined details of corresponding digital product or activate playback or launch of the corresponding digital product.

Figure 8:
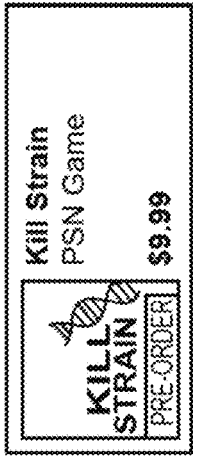
FIG. 8 shows yet another example of a graphical user interface of the online platform showing the personalized calendar adjusted to show all digital product events for a selected date.
Figure 8:
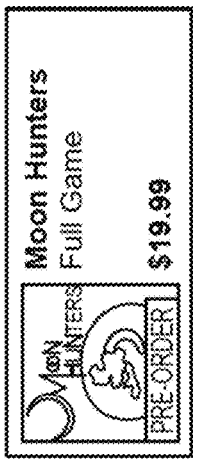
Figure 8:
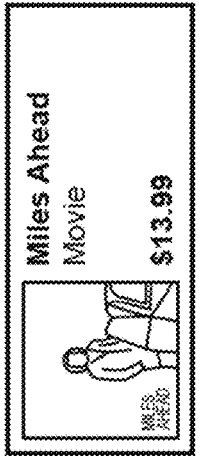
Figure 8:
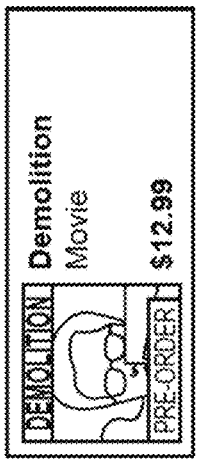
Figure 8:
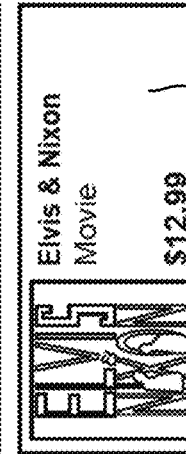
Figure 8:
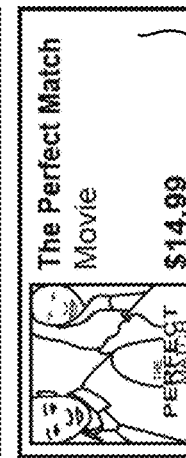
Figure 8:

FIG. 8 shows yet another example of a graphical user interface 800 of the online platform showing the personalized calendar adjusted to show all digital product events for a selected date according to one embodiment. Similar to above-described interfaces, graphical user interface 800 includes a calendar widget 805 to show a portion of calendar having a plurality of day widgets organized in an array. Each of the day widgets can be clickable buttons. The user can select a certain date to view such that the right portion of graphical user interface 800 would display one or more enlarged icons 810, each of which characterize a certain digital product or digital product event. For example, each of enlarged icons 810 can include a representative image of digital product, a title of digital product, a type of digital product (e.g., "full game" or "movie"), a price, and the like. Each of enlarged icons 810 can be a clickable button, which when actuated by the user, causes displaying details of corresponding product or digital product event.

Figure 9:
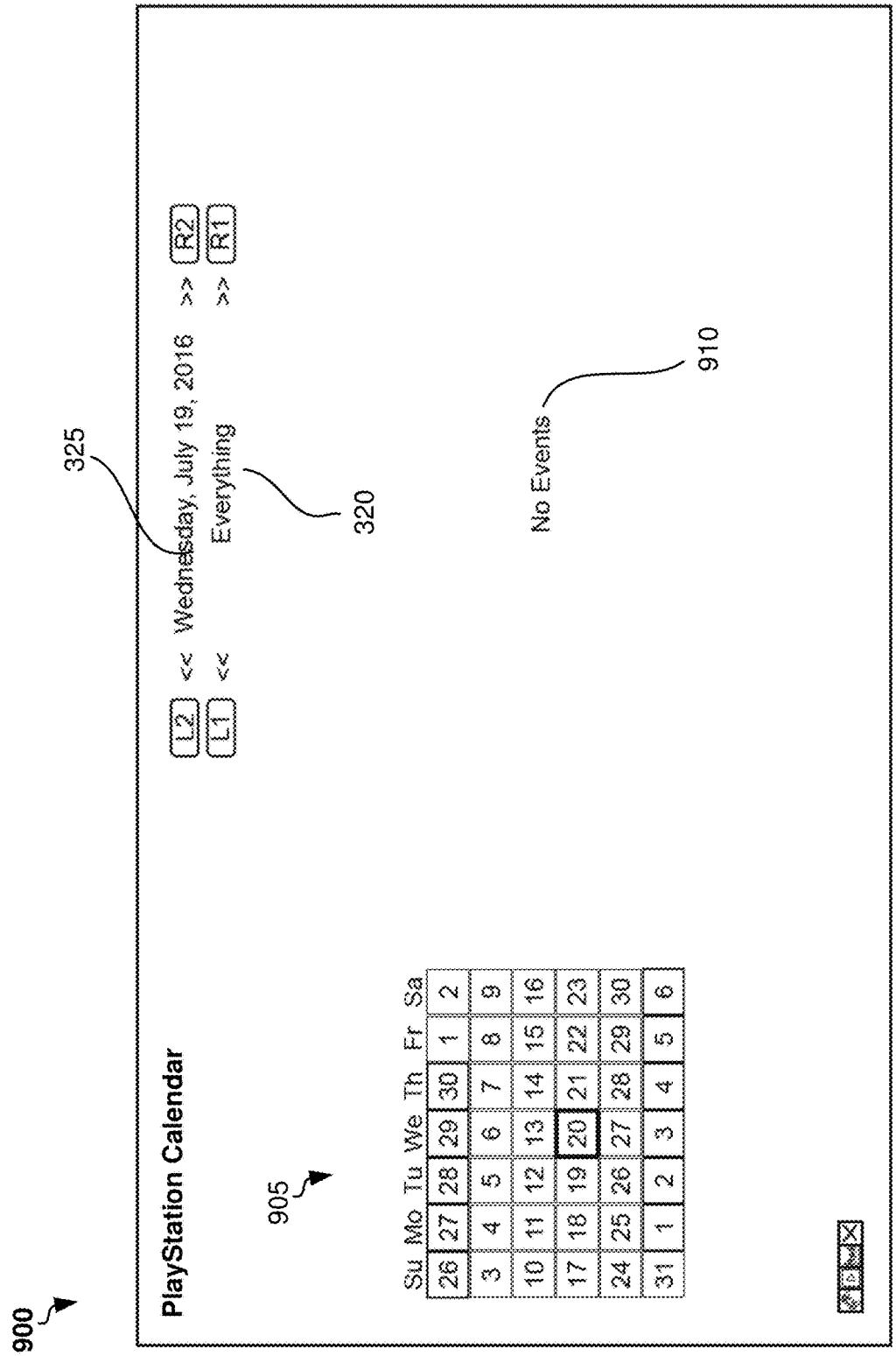
FIG. 9 shows yet another example of a graphical user interface of the online platform showing the personalized calendar where there are no digital product events for a selected date.

FIG. 9 shows yet another example of a graphical user interface 900 of the online platform showing the personalized calendar where there are no digital product events for a selected date, according to one embodiment. In this case, the right portion of graphical user interface 900 includes a user interface element 910 displaying a written statement "No Events" to signal to the user that there are no digital product events scheduled for a given date.

Figure 10:
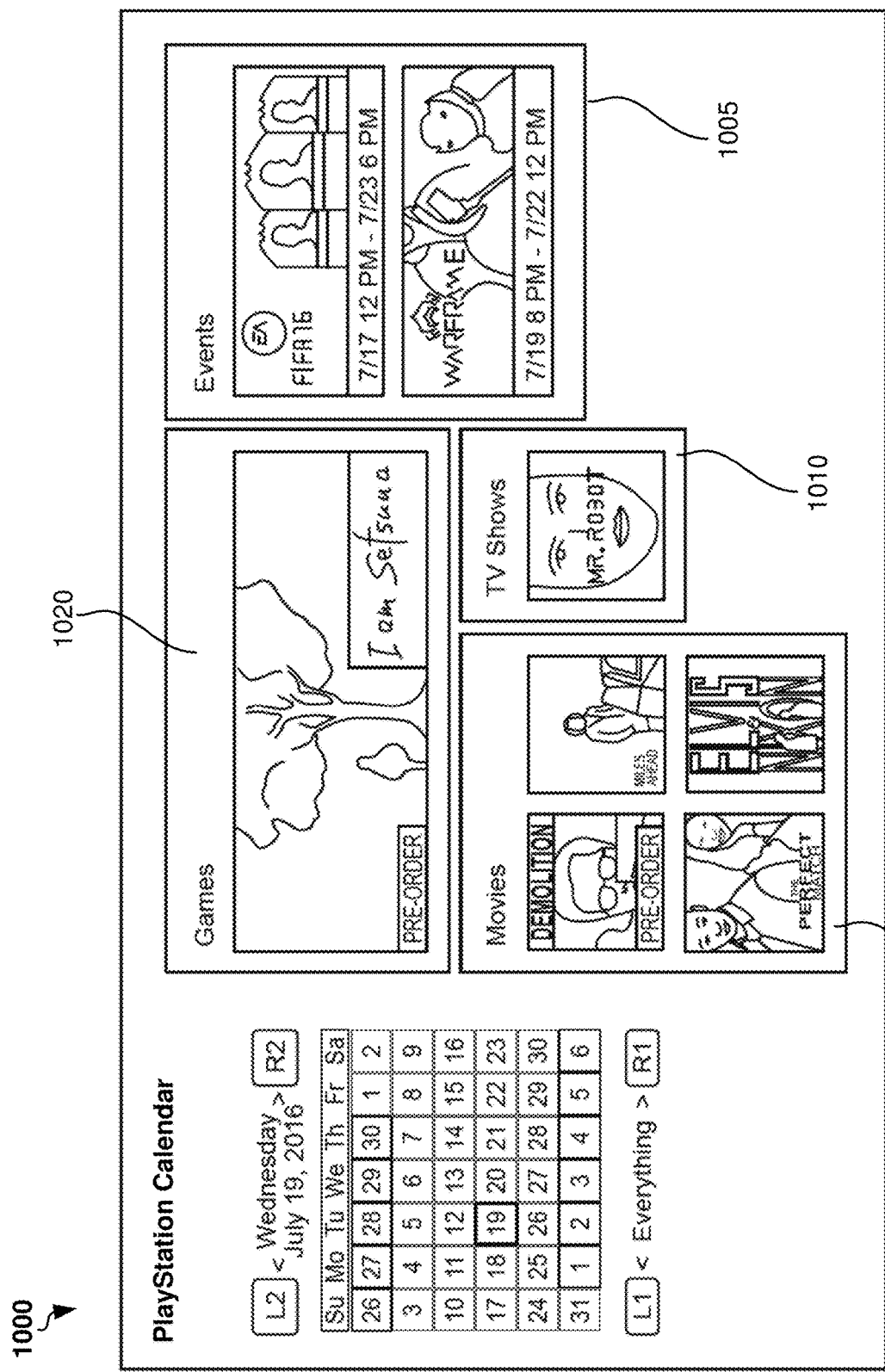
FIG. 10 shows yet another example of a graphical user interface of the online platform showing the personalized calendar adjusted to show all digital product events for a selected date.

FIG. 10 shows yet another example of a graphical user interface 1000 of the online platform showing the personalized calendar adjusted to show all digital product events for a selected date according to one embodiment. Graphical user interface 1000 is substantially the same as graphical user interface 800 but with different layout of graphical user elements. Particularly, graphical user interface 1000 includes a calendar widget in the left part of the interface and a plurality of graphical user interface elements 1005-1020 in the right part of the interface. Graphical user interface element 1005 can show featured digital product events, such as computer game tournaments, for a selected date (e.g., Jul. 16, 2016 as shown in FIG. 10). Graphical user interface element 1010 shows all or featured digital product events related to TV shows for the selected date. Graphical user interface element 1015 shows all or featured digital product events related to movies for the selected date. Graphical user interface element 1020 shows all or featured digital product events related to computer games for the selected date.

Figure 11:
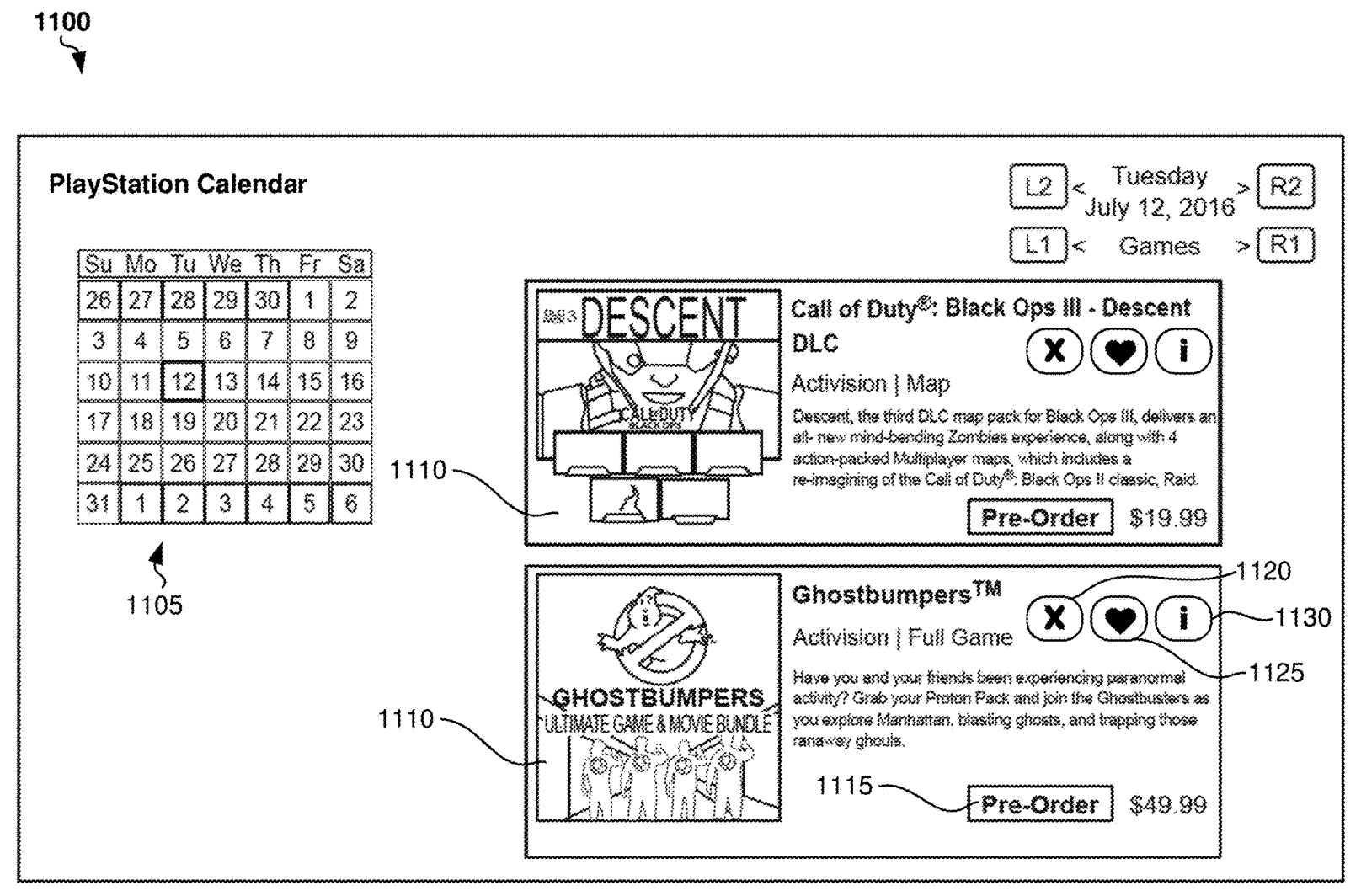

FIG. 11 shows yet another example of a graphical user interface 1100 of the online platform showing the personalized calendar adjusted to show certain digital product events for a selected date according to one embodiment. Graphical user interface 1100 is substantially similar to graphical user interface 1000. Particularly, graphical user interface 1100 includes a calendar widget 1105 in the left part of the interface and a plurality of graphical user interface elements 1110 in the right part of the interface. Each of graphical user interface elements 1110 can show a digital product event, such a computer game, for the date selected by the user. Particularly, each of graphical user interface elements 1110 can include an image representing a digital product (e.g., a computer game), a title of digital product (e.g., "Call or Duty"), a description of digital product, a price of digital product, a status of digital product (e.g., available for purchase or purchased), and one or more hyperlinks or clickable (soft) buttons. For example, each of graphical user interface elements 1110 can have a hyperlink or clickable (soft) button 1115 to cause purchasing, ordering or pre-ordering a selected digital product. Each of graphical user interface elements 1110 can also include a hyperlink or clickable button 1120, which when enabled by the user, causes launching a software application corresponding to the respective digital product of graphical user interface element 1110. For example, by clicking on button 1120, an online store for purchasing the corresponding digital product can be opened or a computer game software application can be started thereby launching the corresponding digital product. Each of graphical user interface elements 1110 can also include a hyperlink or clickable button 1125, which when enabled by the user, causes liking or featuring the respective digital product by the user. For example, if the user clicks button 1125, the corresponding digital product becomes marked with a "heart" symbol or can become placed in "My Stuff" folder of the user. Each of graphical user interface elements 1110 can also include a hyperlink or clickable button 1130, which when enabled by the user, causes creating, by the user, a notification rule associated with the respective digital product. The notification rule may cause sending alerts or messages to user device 210 of the user to remind or notify him of certain digital product events. For example, the user can receive a reminder when a certain digital product is released.

FIGS. 14-23 show examples of graphical user interfaces, which are similar to the graphical user interfaces shown in FIGS. 3-11 and facilitate understanding of the technology described herein. The graphical user interfaces of FIGS. 14-23 can be displayed on a display of user devices 210. User interactions with the graphical user interfaces of FIGS. 14-23 are similar to user interactions with the graphical user interfaces described above with reference to FIGS. 3-11.

Figure 12:
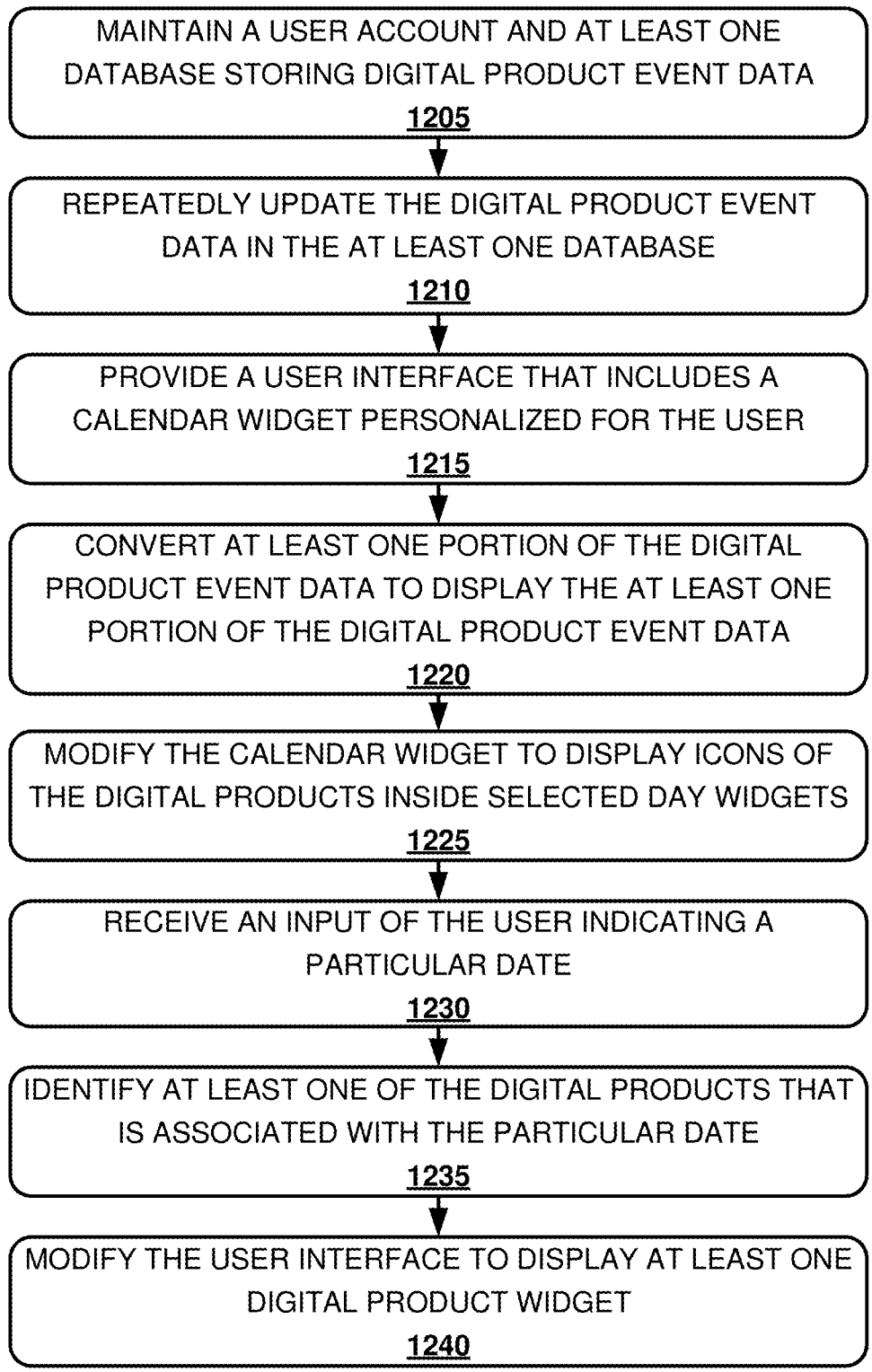
FIG. 12 is a process flow diagram showing a method for providing a personalized calendar.

FIG. 12 is a process flow diagram showing a method 1200 for providing a personalized calendar according to an example embodiment. Method 1200 may be performed by processing logic that may comprise hardware (e.g., decision-making logic, dedicated logic, programmable logic, application-specific integrated circuit), software (such as software run on a general-purpose computer system or a dedicated machine), or a combination of both. In one example embodiment, the processing logic refers to server 205 of FIG. 2. Below recited operations of method 1200 may be implemented in an order different than described and shown in the figure. Moreover, method 1200 may have additional operations not shown herein, but which can be evident for those skilled in the art from the present disclosure. Method 1200 may also have fewer operations than outlined below and shown in FIG. 12.

Method 1200 commences at operation 1205 with server 205 maintaining a user account. In certain embodiments, the user account can include user name, user identifier, user credentials (e.g., login and password), user preferences regarding digital products, user settings, notifications, purchased or ordered digital products (e.g., identifiers of digital products), data related to featured digital products, data linking to other users of the platform, and so forth.

The server 205 also maintains at least one database, such as database 220, for storing digital product event data. The digital product event data can associate or link a plurality of digital products with respective digital products' event dates. In other words, the digital product event data can provide when a certain digital product is to be released or was released to the public or a certain user. The digital products can be characterized by digital product identifiers. Accordingly, the digital product identifiers can be associated with user identifiers and digital product event data in a relational database.

At operation 1210, server 205 repeatedly updates the digital product event data in the at least one database such as database 220. For example, when new digital products are placed on the market or are to be placed on the market, the database can be updated to include new release dates of certain digital products. The digital product event data can be updated based on information acquired from a plurality of remote servers or web services such as content provider 225.

At operation 1215, server 205 provides a user interface for the user of the user account. Examples of the user profile are described above with reference to FIGS. 3-11. Accordingly, the user interface is displayable on user device 210 of the user. The user interface can include at least a calendar widget personalized for the user based on the user account. The calendar widget includes a plurality of day widgets, where each of the day widgets can be associated with a particular date. For example, the calendar widget can be personalized based on user settings, preferences, subscriptions, and the like, such that the calendar widget displays event data of only those digital products that are of interest (or available or relevant) to the user. For example, the calendar widget displays event data of only those movies or TV shows that are from the same country or territory as the user. Alternatively, event data of all digital products can be provided through the calendar widget.

At operation 1220, server 205 converts at least one portion of the digital product event data to display the at least one portion of the digital product event data through the calendar widget. For example, the digital product event data is converted such that it can be presented as user interface elements or widgets and showed in the user interface. Other conversion processes are also permitted.

The user interface can also enable the user to review, purchase, and access one or more digital products from the remote user device. For example, the user interface elements or widgets related to the digital product event data can be actionable such that when the user clicks on these user interface elements or widgets, server 205 or user device 210 causes purchasing a selected digital product or redirecting to a corresponding online store for purchasing a selected digital product.

At operation 1225, server 205 modifies the calendar widget to display one or more icons of the digital products inside selected day widgets (e.g., as shown by icons 410) based on the digital product event data, where each of the icons is associated with one of the digital products and a release date of that digital product. In some embodiments, each of the icons can be associated with featured digital products.

At operation 1230, server 205 receives an input of the user, which indicates a particular date in the calendar widget. For example, the user can use a game controller or trackball to select or click one of the day widgets (e.g., day widget 305).

At operation 1235, in response to the input of the user, server 205 identifies at least one of the digital products that is associated with the particular date of the input based on the digital product event data stored in the database. In other words, when the user selects one of the days in the calendar widget, server 205 determines or identifies which of certain digital products are to be released or were released on that date.

At operation 1240, in response to the input of the user, server 205 modifies the user interface to display, in addition to the calendar widget, at least one digital product widget (e.g., such as shown in FIGS. 5-8, 10, and 11), where the at least one digital product widget is associated with at least one identified digital product. As explained above with reference to FIG. 11, at least one of the digital product widget can include: (a) a graphic element for identifying a respective digital product; (b) a first actionable button, which, when enabled by the user, cause launching a software application corresponding to the respective digital product; (c) a second actionable button, which, when enabled by the user, cause liking or featuring the respective digital product; (d) and a third actionable button, which, when enabled by the user, cause creating a notification rule associated with the respective digital product. In certain embodiments, server 205 can provide one or more notification messages to the user via the user interface based on the notification rule.

Figure 13:
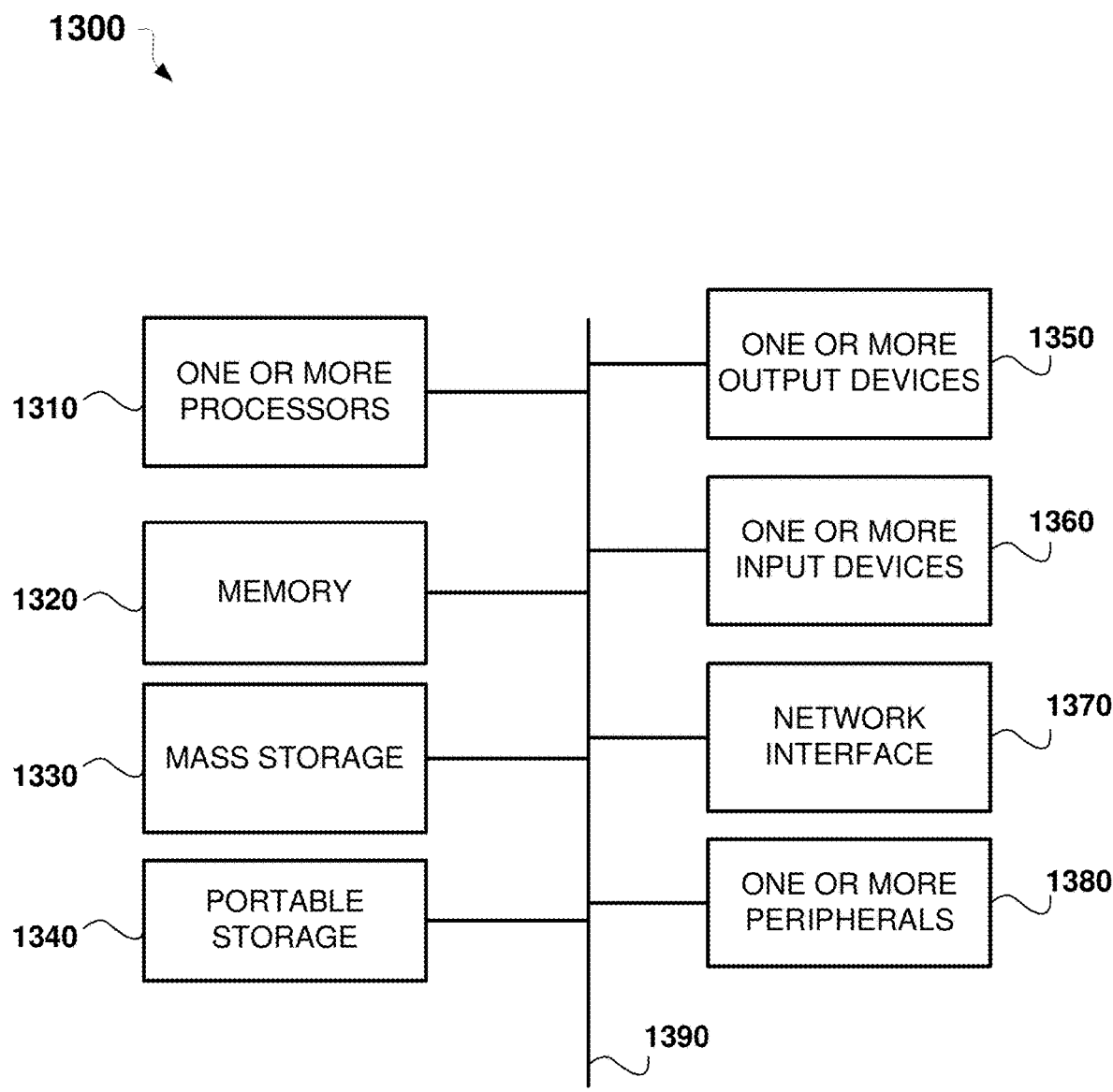
FIG. 13 shows an example computer system that may be used to implement the method for providing a personalized calendar.
Figure 14:
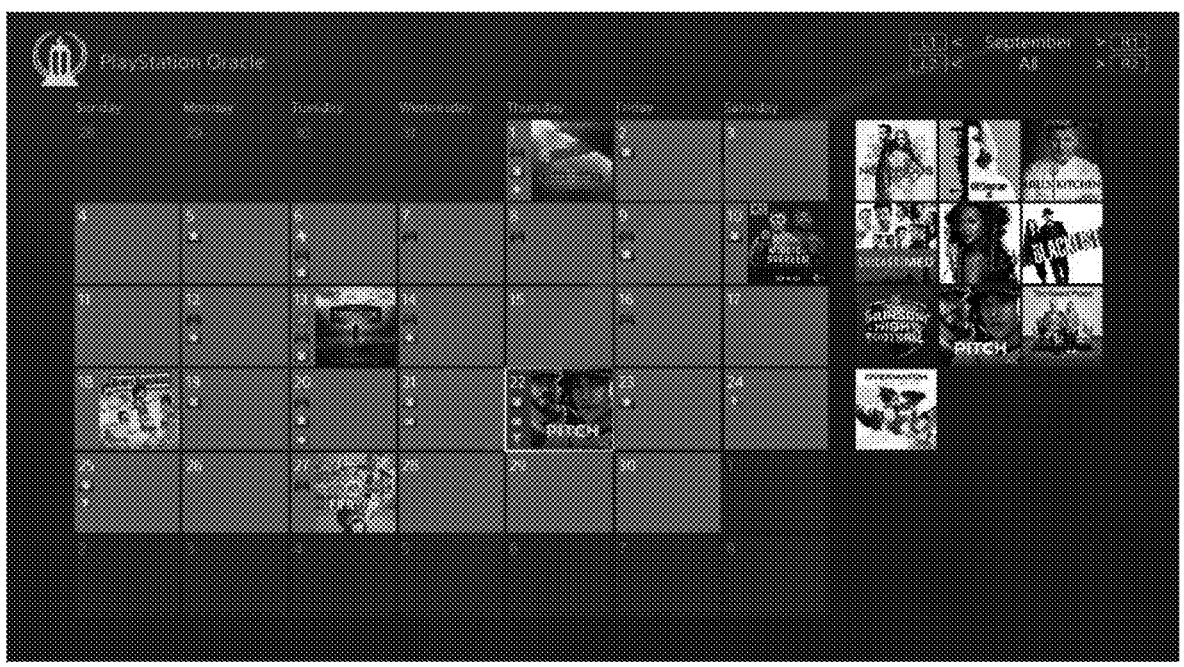
FIGS. 14-23 show examples of graphical user interfaces.
Figure 15:
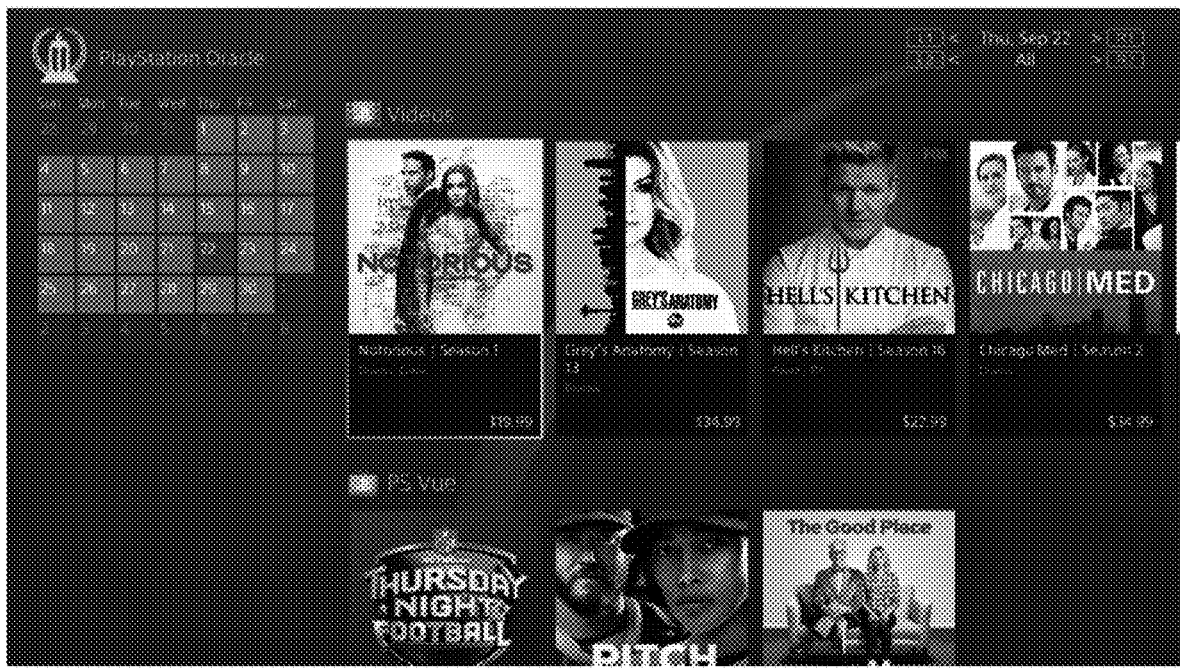
Figure 16:
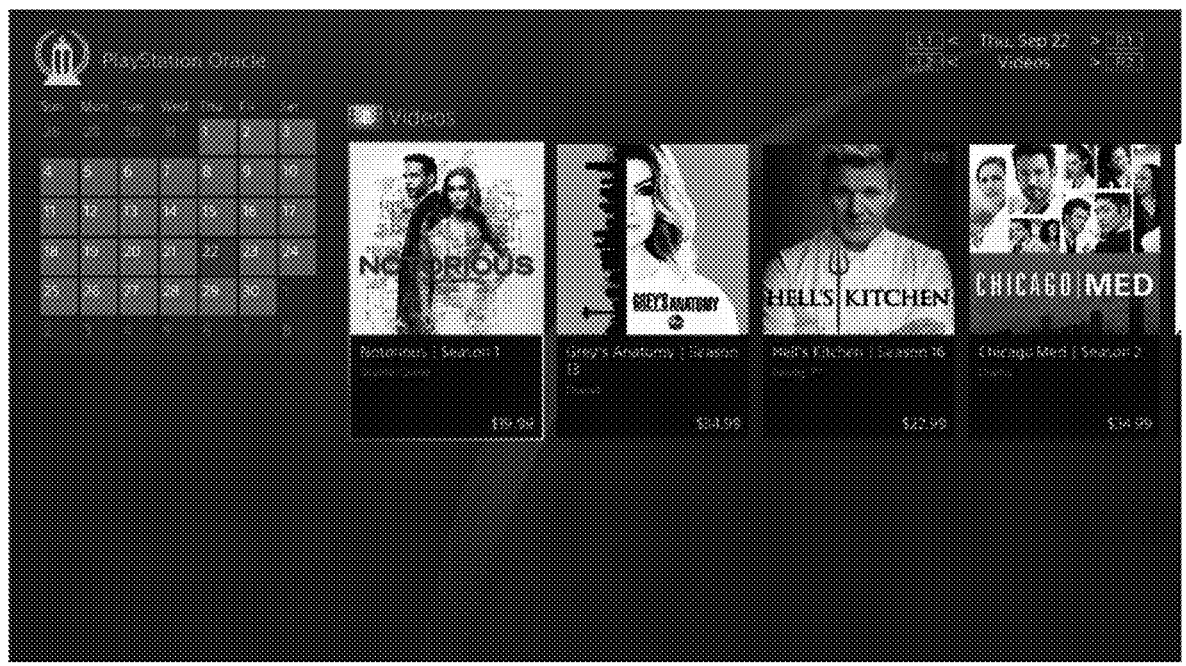
Figure 17:
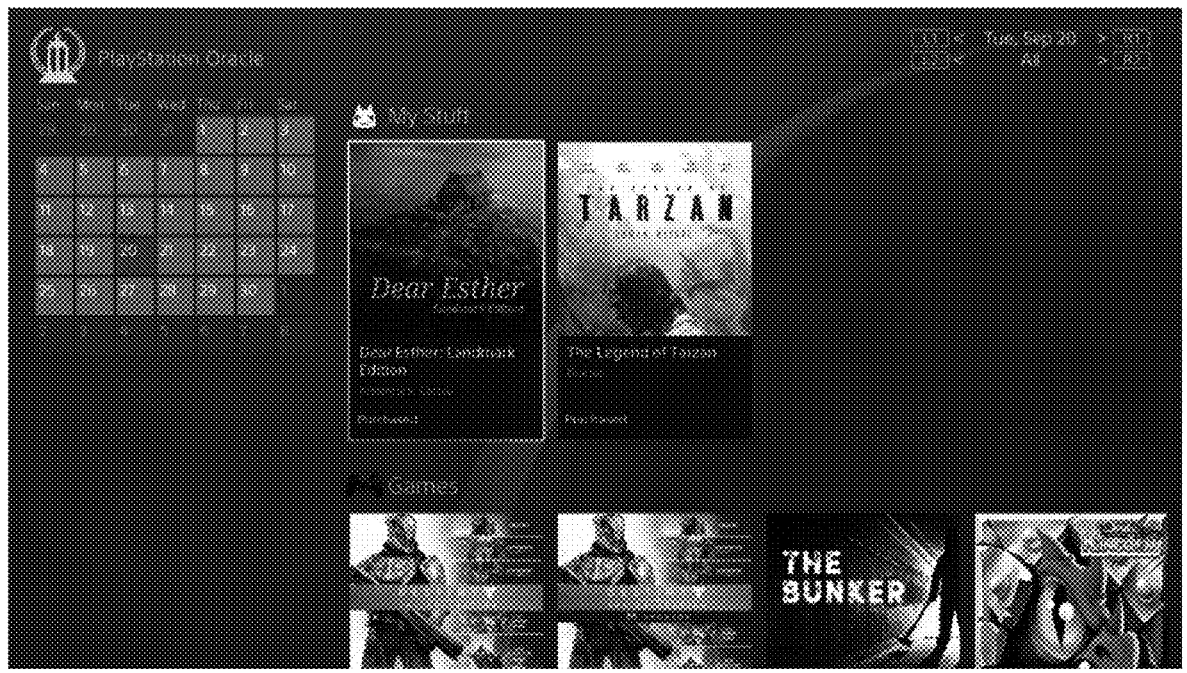
Figure 18:
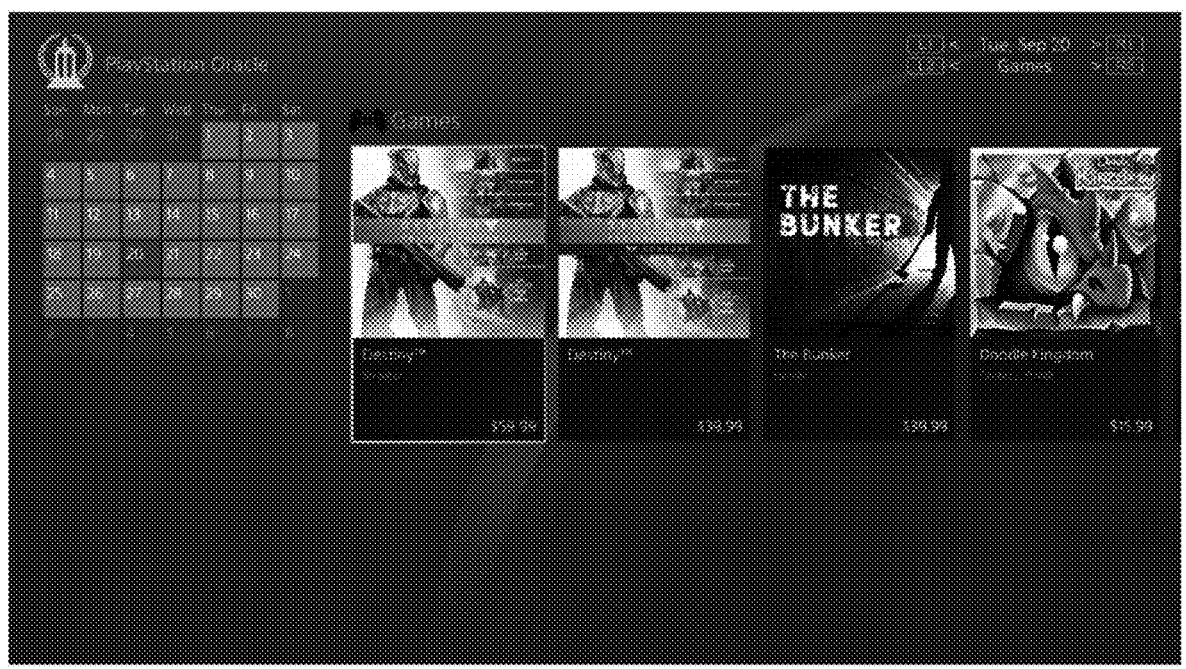
Figure 19:
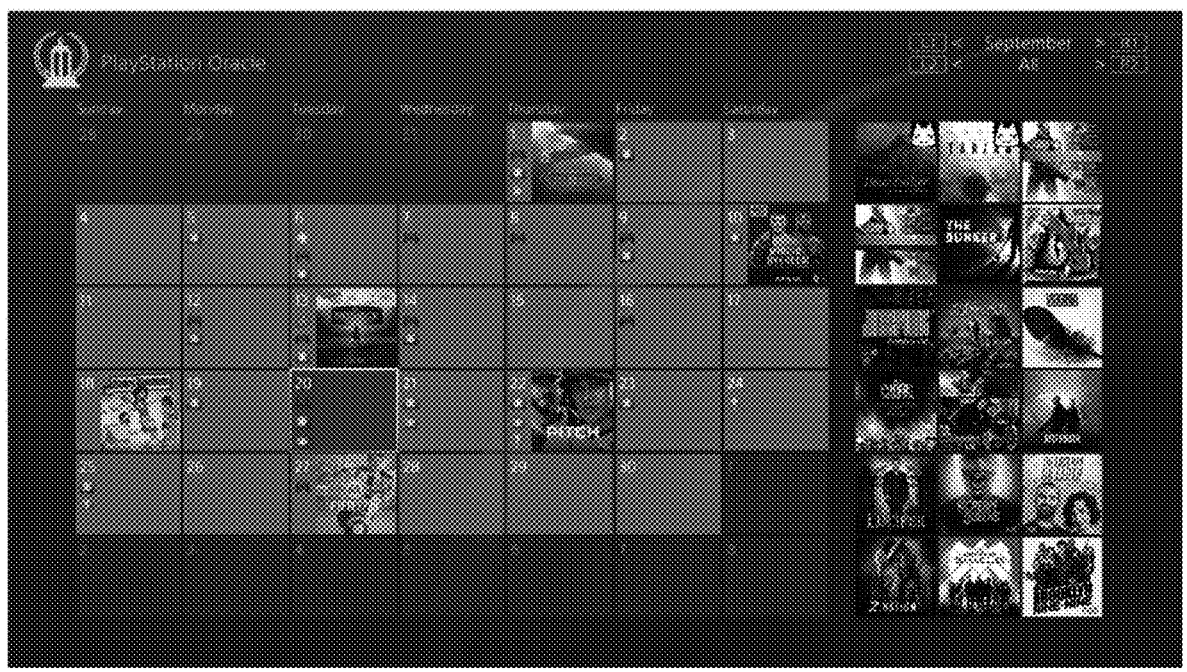
Figure 20:
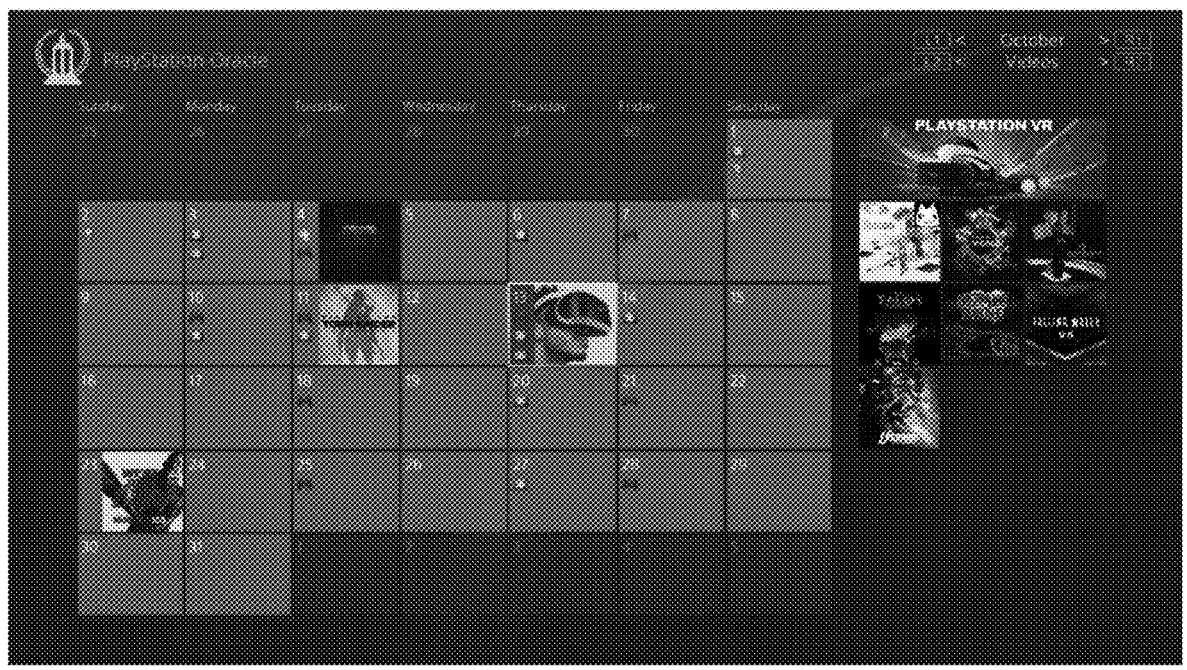
Figure 21:
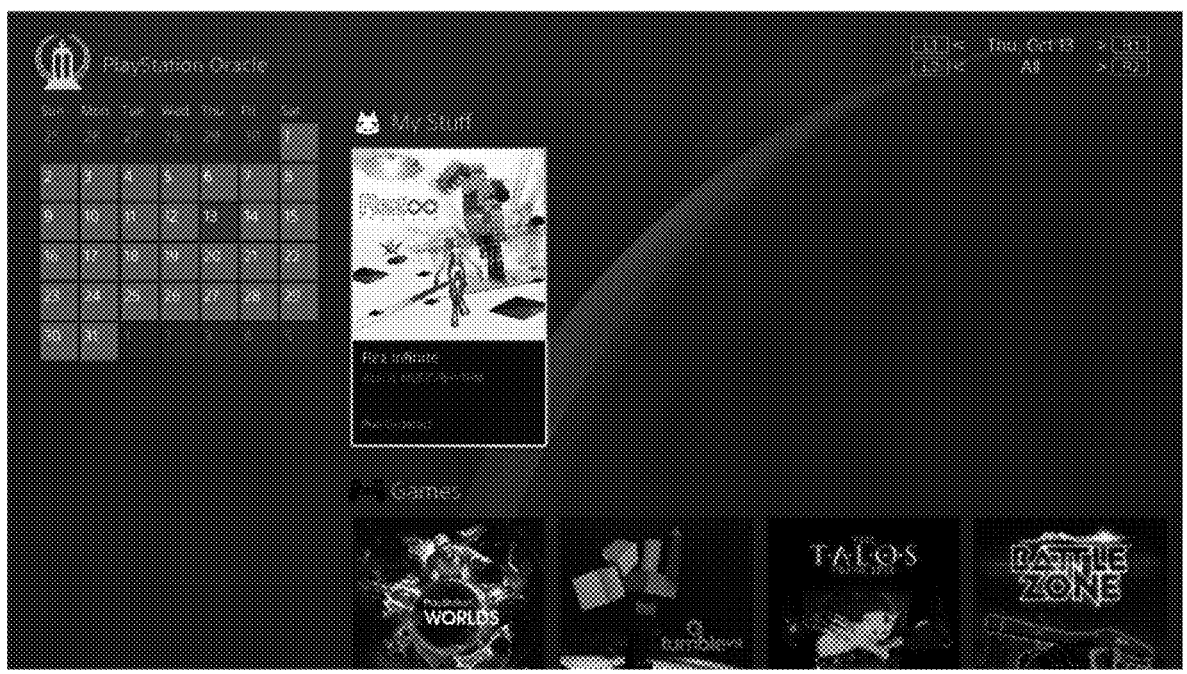
Figure 22:
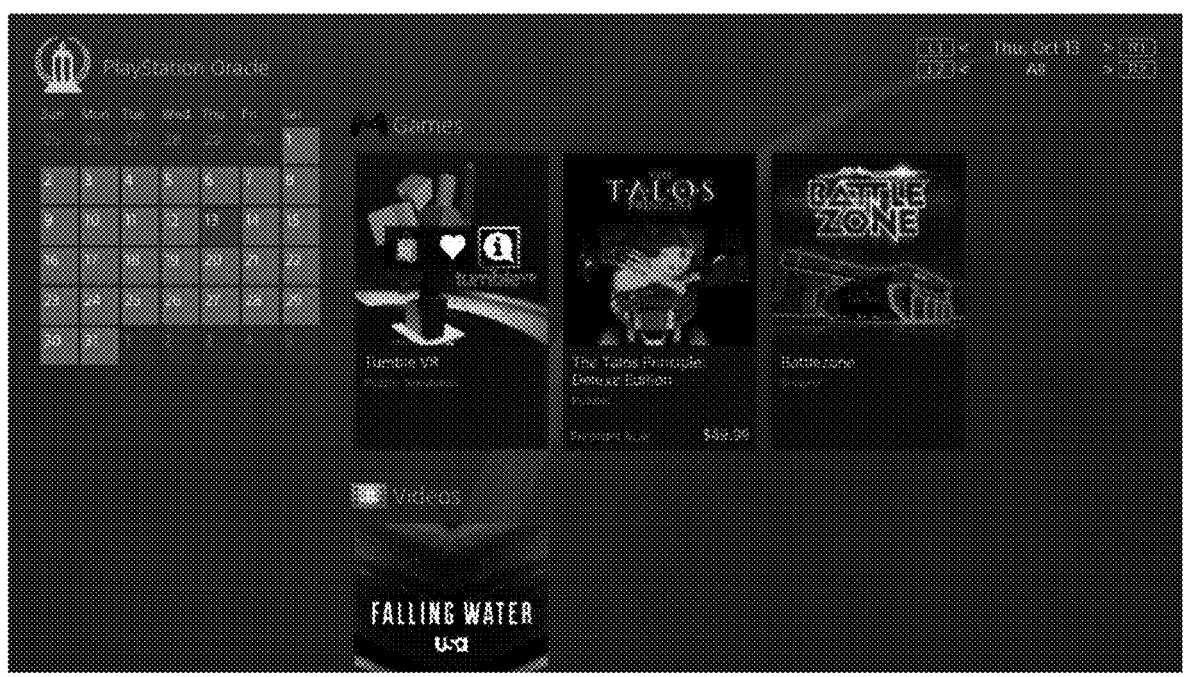
Figure 23:
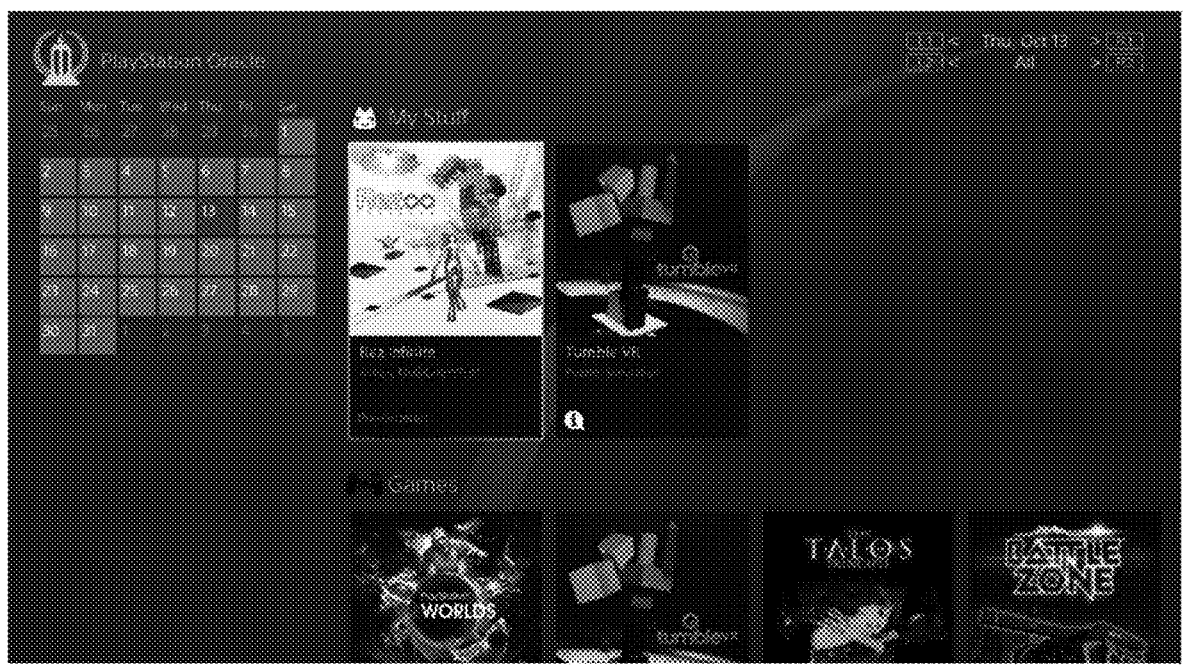

FIG. 13 is a high-level block diagram illustrating a computing device 1300 suitable for implementing the methods described herein. In particular, computing device 1300 may be used for implementing the methods for providing a personalized calendar as described herein. Computing device 1300 may include, be, or be an integral part of one or more of a variety of types of devices, such as a general-purpose computer, desktop computer, laptop computer, tablet computer, server, netbook, mobile phone, smartphone, infotainment system, smart television device, among others. In some embodiments, computing device 1300 can be regarded as an instance of server 205 or user device 210.

As shown in FIG. 13, computing device 1300 includes one or more processors 1310, memory 1320, one or more mass storage devices 1330, one or more output devices 1350, one or more input devices 1360, network interface 1370, one or more optional peripheral devices 1380, and a communication bus 1390 for operatively interconnecting the above-listed elements. Processors 1310 can be configured to implement functionality and/or process instructions for execution within computing device 1300. For example, processors 1310 may process instructions stored in memory 1320 or instructions stored on mass storage devices 1330. Such instructions may include components of an operating system or software applications.

Memory 1320, according to one example, is configured to store information within computing device 1300 during operation. For example, memory 1320 can store database 220 or digital media content such as digital products, digital product data, and digital product event data. Memory 1320, in some example embodiments, may refer to a non-transitory computer-readable storage medium or a computer-readable storage device. In some examples, memory 1320 is a temporary memory, meaning that a primary purpose of memory 1320 may not be long-term storage. Memory 1320 may also refer to a volatile memory, meaning that memory 1320 does not maintain stored contents when memory 1320 is not receiving power. Examples of volatile memories include random access memories (RAM), dynamic random access memories (DRAM), static random access memories (SRAM), and other forms of volatile memories known in the art. In some examples, memory 1320 is used to store program instructions for execution by processors 1310. Memory 1320, in one example, is used by software applications. Generally, software applications refer to software applications suitable for implementing at least some operations of the methods for collecting intent parameters and operating a dialog system as described herein.

Mass storage devices 1330 can also include one or more transitory or non-transitory computer-readable storage media or computer-readable storage devices. For example, memory 1320 can store database 220 or digital media content such as digital products, digital product data, and digital product event data. In some embodiments, mass storage devices 1330 may be configured to store greater amounts of information than memory 1320. Mass storage devices 1330 may be also configured for long-term storage of information. In some examples, mass storage devices 1330 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 13, computing device 1300 may also include one or more input devices 1360. Input devices 1360 may be configured to receive input from a user through tactile, audio, video, or biometric channels. Examples of input devices 1360 may include a keyboard, keypad, mouse, trackball, touchscreen, touchpad, microphone, video camera, image sensor, fingerprint sensor, or any other device capable of detecting an input from a user or other source, and relaying the input to computing device 1300 or components thereof. Output devices 1350 may be configured to provide output to a user through visual or auditory channels. Output devices 1350 may include a video graphics adapter card, display, such as liquid crystal display (LCD) monitor, light emitting diode (LED) monitor, or organic LED monitor, sound card, speaker, lighting device, projector, or any other device capable of generating output that may be intelligible to a user. Output devices 1350 may also include a touchscreen, presence-sensitive display, or other input/output capable displays known in the art.

Computing device 1300 can also include network interface 1370. Network interface 1370 can be utilized to communicate with external devices via one or more networks such as one or more wired, wireless, or optical networks including, for example, the Internet, intranet, local area network, wide area network, cellular phone networks (e.g., Global System for Mobile communications network, Long-Term Evolution communications network, packet switching communications network, circuit switching communications network), Bluetooth radio, and an IEEE 802.11-based radio frequency network, among others. Network interface 1370 may be a network interface card, such as an Ethernet card, an optical transceiver, a radio frequency transceiver, or any other type of device that can send and receive information.

An operating system of computing device 1300 may control one or more functionalities of computing device 1300 or components thereof. For example, the operating system may interact with the software applications and may facilitate one or more interactions between the software applications and processors 1310, memory 1320, mass storage devices 1330, input devices 1360, output devices 1350, and network interface 1370. The operating system may interact with or be otherwise coupled to software applications or components thereof. In some embodiments, software applications may be included in operating system.

Thus, methods and systems for providing a personalized calendar have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for providing a personalized calendar, the system comprising:

a server including at least one processor, a non-transitory computer-readable medium including a computer-executable program code, and a network interface configured to operatively connect the server with a plurality of remote user devices; and at least one database hosted by the server, the at least one database storing digital product event data, the digital product event data associating a plurality of digital products with respective digital products event dates, the digital product event data being selected from a plurality of remote sources and stored, by the server, to the at least one database, the plurality of remote sources providing the plurality of digital products;

wherein, when the computer-executable program code is executed by the at least one processor, the at least one processor:

repeatedly updates the digital product event data in the at least one database;

provides a user interface for a user of a user account, the user interface being displayable on a remote user device of the user, wherein the user interface includes a calendar widget personalized for the user based on the user account, the calendar widget being displayed in a first portion of the user interface;

converts at least one portion of the digital product event data into one or more graphical elements to display the at least one portion of the digital product event data through the calendar widget in a form of the one or more graphical elements, wherein the calendar widget includes a plurality of day widgets and wherein, upon selection of each of the plurality of day widgets by the user, the each of the plurality of day widgets is displayed in a second portion of the user interface, the second portion being different from the first portion;

during the displaying of the at least one portion of the digital product event data, receive, from the user, an input requesting an access to one or more digital products of the plurality of digital products, the one or more digital products being associated with the at least one portion of the digital product event data; and based on the input, grant, to the remote user device, the access to one of the plurality of remote sources to enable the user to access the one or more digital product via the remote user device, the one of the plurality of remote sources providing the one or more digital products.

2. The system of claim 1, wherein the user interface enables the user to review, purchase, and at least partially download the one or more digital products via the remote user device.

3. The system of claim 1, wherein each of the plurality of day widgets is uniquely associated with a particular day or time.

4. The system of claim 3, wherein, when the computer-executable program code is executed by the at least one processor, the at least one processor further:
modifies the calendar widget to display one or more icons of the plurality of digital products inside selected day widgets based on the digital product event data, wherein each of the icons is associated with one of the plurality of digital products.

5. The system of claim 4, wherein at least one of the icons is associated with a release date of a digital product.

6. The system of claim 4, wherein at least one of the icons is associated with a featured digital product.

7. The system of claim 3, wherein, when the computer-executable program code is executed by the at least one processor, the at least one processor further:
determines that the input indicates a particular date;
identifies at least one of the plurality of digital products that is associated with the particular date of the selection from the user based on the digital product event data stored in the database; and
in response to the selection from the user, modifies the user interface to display, in addition to the calendar widget, at least one digital product widget, wherein the at least one digital product widget is associated with at least one identified digital product.

8. The system of claim 7, wherein the at least one digital product widget includes:
a graphic element for identifying a respective digital product;
a first actionable button, which, when enabled by the user, cause launching a software application corresponding to the respective digital product;
a second actionable button, which, when enabled by the user, cause liking or featuring the respective digital product; and
a third actionable button, which, when enabled by the user, cause creating a notification rule associated with the respective digital product.

9. The system of claim 8, wherein, when the computer-executable program code is executed by the at least one processor, the at least one processor further:
provides a notification message to the user via the user interface based on the notification rule.

10. A computer-implemented method for providing a personalized calendar, the method comprising:
maintaining, by a server, a user account;
maintaining, by the server, at least one database storing digital product event data, the digital product event data associating a plurality of digital products with respective digital products event dates, the digital product event data being selected from a plurality of remote sources and stored, by the server, to the at least one database, the plurality of remote sources providing the plurality of digital products;
repeatedly updating, by the server, the digital product event data in the at least one database;
providing, by the server, a user interface for a user of the user account, the user interface being displayable on a remote user device of the user, wherein the user interface includes a calendar widget personalized for the user based on the user account, the calendar widget being displayed in a first portion of the user interface;
converting, by the server, at least one portion of the digital product event data into one or more graphical elements to display the at least one portion of the digital product event data through the calendar widget in a form of the one or more graphical elements, wherein the calendar widget includes a plurality of day widgets and wherein, upon selection of each of the plurality of day widgets by the user, the each of the plurality of day widgets is displayed in a second portion of the user interface, the second portion being different from the first portion;
during the displaying of the at least one portion of the digital product event data, receiving, from the user, an input requesting an access to one or more digital products of the plurality of digital products, the one or more digital products being associated with the at least one portion of the digital product event data; and
based on the input, granting, to the remote user device, the access to one of the plurality of remote sources to enable the user to access the one or more digital products via the remote user device, the one of the plurality of remote sources providing the one or more digital products.

11. The method of claim 10, wherein the user interface enables the user to review, purchase, and at least partially download the one or more digital products via the remote user device.

12. The method of claim 10, wherein each of the plurality of day widgets is associated with a particular date.

13. The method of claim 12, further comprising:
modifying, by the server, the calendar widget to display one or more icons of the plurality of digital products inside selected day widgets based on the digital product event data, wherein each of the icons is associated with one of the plurality of digital products.

14. The method of claim 13, wherein at least one of the icons is associated with a release date of a digital product.

15. The method of claim 13, wherein at least one of the icons is associated with a featured digital product.

16. The method of claim 12, further comprising:
determining that the input indicates a particular date;
identifying, by the server, at least one of the plurality of digital products that is associated with the particular date of the input based on the digital product event data stored in the database; and
in response to the input, modifying, by the server, the user interface to display, in addition to the calendar widget, at least one digital product widget, wherein the at least one digital product widget is associated with at least one identified digital product.

17. The method of claim 16, wherein the at least one digital product widget includes a graphic element for identifying a respective digital product, a first actionable button, which, when enabled by the user, cause launching a software application corresponding to the respective digital product, a second actionable button, which, when enabled by the user, cause liking or featuring the respective digital product, and a third actionable button, which, when enabled by the user, cause creating a notification rule associated with the respective digital product.

18. The method of claim 17, further comprising providing, by the server, a notification message to the user via the user interface based on the notification rule.

19. The method of claim 10, wherein the plurality of digital products includes at least video-on-demand content and at least one network computer game.

20. A non-transitory processor-readable medium having instructions stored thereon, which when executed by one or more processors, cause the one or more processors to implement a method, the method comprising:

maintaining, by a server, a user account;

maintaining, by the server, at least one database storing digital product event data, wherein the digital product event data associates a plurality of digital products with respective digital products event dates, the digital product event data being selected from a plurality of remote sources and stored, by the server, to the at least one database, the plurality of remote sources providing the plurality of digital products;

repeatedly updating, by the server, the digital product event data in the at least one database;

providing, by the server, a user interface for a user of the user account, the user interface being displayable on a remote user device of the user, wherein the user interface includes a calendar widget personalized for the user based on the user account, the calendar widget being displayed in a first portion of the user interface;

converting, by the server, at least one portion of the digital product event data into one or more graphical elements to display the at least one portion of the digital product event data through the calendar widget in a form of the one or more graphical elements, wherein the calendar widget includes a plurality of day widgets and wherein, upon selection of each of the plurality of day widgets by the user, the each of the plurality of day widgets is displayed in a second portion of the user interface, the second portion being different from the first portion;

during the displaying of the at least one portion of the digital product event data, receiving, from the user, an input requesting an access to one or more digital products of the plurality of digital products, the one or more digital products being associated with the at least one portion of the digital product event data; and based on the input, granting, to the remote user device, the access to one of the plurality of remote sources to enable the user to access the one or more digital products via the remote user device, the one of the plurality of remote sources providing the one or more digital products.

* * * * *